United States Patent
Zou et al.

(10) Patent No.: US 10,914,452 B2
(45) Date of Patent: Feb. 9, 2021

(54) OPTICAL ELEMENT, LIGHT SOURCE CIRCUIT AND LIGHTING DEVICE

(71) Applicant: OPPLE LIGHTING CO., LTD., Shanghai (CN)

(72) Inventors: Donghong Zou, Shanghai (CN); Guobao Zhang, Shanghai (CN); Yang Li, Shanghai (CN); Chao Yan, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/124,294

(22) Filed: Sep. 7, 2018

(65) Prior Publication Data
US 2018/0363881 A1    Dec. 20, 2018

Related U.S. Application Data

(63) Continuation of application No. PCT/CN2017/073612, filed on Feb. 15, 2017.

(30) Foreign Application Priority Data

Mar. 7, 2016  (CN) .......................... 2016 1 0128753
Mar. 7, 2016  (CN) ..................... 2016 2 0172136 U

(51) Int. Cl.
*F21V 5/04* (2006.01)
*F21V 5/00* (2018.01)
(Continued)

(52) U.S. Cl.
CPC ................ *F21V 5/04* (2013.01); *F21V 5/007* (2013.01); *F21V 14/06* (2013.01); *F21V 17/06* (2013.01);
(Continued)

(58) Field of Classification Search
CPC .......... F21V 5/04; F21V 5/007; F21V 23/005; F21V 3/00; F21V 17/002; F21V 17/005;
(Continued)

(56) References Cited

U.S. PATENT DOCUMENTS 5,319,531 A * 6/1994 Kutnyak ................ A63H 33/18
                                                       362/184
9,470,382 B1 * 10/2016 Sharrah ..................... F21L 4/02
(Continued)

FOREIGN PATENT DOCUMENTS

CN   202403183 U   8/2012
CN   203628362 U   6/2014
(Continued)

OTHER PUBLICATIONS

International Search Report and Written Opinion (including English translations) issued in corresponding International Patent Application No. PCT/CN2017/073612, dated Mar. 30, 2017, 16 pages.

*Primary Examiner* — Erin Kryukova
(74) *Attorney, Agent, or Firm* — Arch & Lake LLP

(57) ABSTRACT

The present disclosure discloses a light source circuit and a lighting device. The light source circuit includes: a substrate, a light source mounted on a surface of the substrate, and an optical element assembled on the substrate; the substrate is provided with a first light source connection region and a second light source connection region; the optical element is provided with a first lens corresponding to the first light source connection region and is provided with a plurality of second lenses corresponding to the second light source connection region; and the light source at least includes a first light source arranged on the first light source connection region.

18 Claims, 29 Drawing Sheets

(51) Int. Cl.
*G02B 19/00* (2006.01)
*F21V 14/06* (2006.01)
*F21V 17/06* (2006.01)
*F21V 23/00* (2015.01)
*F21Y 115/10* (2016.01)
*F21Y 105/18* (2016.01)
*F21V 3/00* (2015.01)

(52) U.S. Cl.
CPC ........ *F21V 23/005* (2013.01); *G02B 19/0014* (2013.01); *G02B 19/0047* (2013.01); *F21V 3/00* (2013.01); *F21Y 2105/18* (2016.08); *F21Y 2115/10* (2016.08)

(58) Field of Classification Search
CPC .......... F21V 17/04; F21V 17/06; F21V 17/10; F21V 17/16; F21V 17/164; F21V 17/105; F21Y 2105/18; F21Y 2103/33; F21Y 2103/30; F21Y 2105/12; F21Y 2105/14; F21Y 2105/16; G02B 19/0047; G02B 19/0066; G02B 19/0014; F21S 8/04; F21S 8/046; F21S 8/026
See application file for complete search history.

(56) References Cited

U.S. PATENT DOCUMENTS

| | | | | |
|---|---|---|---|---|
| 10,066,805 B1* | 9/2018 | Tsai | ............ | B60Q 1/2607 |
| 10,077,878 B2* | 9/2018 | Tsuchiya | ............ | B62J 6/02 |
| 2003/0053310 A1* | 3/2003 | Sommers | ............ | F21V 5/006 |
| | | | | 362/231 |
| 2008/0151542 A1* | 6/2008 | Liddle | ............ | F21S 10/00 |
| | | | | 362/240 |
| 2012/0051069 A1* | 3/2012 | Lim | ............ | F21V 3/00 |
| | | | | 362/373 |
| 2012/0087118 A1* | 4/2012 | Bailey | ............ | F21V 5/04 |
| | | | | 362/235 |
| 2012/0162980 A1* | 6/2012 | Mrakovich | ............ | F21V 29/004 |
| | | | | 362/235 |
| 2012/0268943 A1* | 10/2012 | Walczak | ............ | F21V 5/04 |
| | | | | 362/294 |
| 2013/0003374 A1* | 1/2013 | Chou | ............ | F21V 5/04 |
| | | | | 362/249.02 |
| 2013/0010473 A1* | 1/2013 | Dellian | ............ | F21V 15/013 |
| | | | | 362/249.02 |
| 2013/0101953 A1* | 4/2013 | Stone | ............ | F21V 5/002 |
| | | | | 433/29 |
| 2013/0170207 A1* | 7/2013 | Garcia | ............ | F21V 5/007 |
| | | | | 362/238 |
| 2014/0334149 A1* | 11/2014 | Nolan | ............ | F21V 5/007 |
| | | | | 362/235 |
| 2015/0167922 A1* | 6/2015 | Casper | ............ | F21V 23/02 |
| | | | | 362/311.02 |
| 2015/0184827 A1* | 7/2015 | Lin | ............ | F21V 5/04 |
| | | | | 362/311.02 |
| 2016/0018063 A1 | 1/2016 | Skergeth | | |
| 2016/0040845 A1* | 2/2016 | Kuo | ............ | F21V 5/04 |
| | | | | 362/518 |
| 2016/0195237 A1* | 7/2016 | Quadri | ............ | F21V 5/007 |
| | | | | 362/232 |
| 2016/0234414 A1* | 8/2016 | Chen | ............ | H04N 7/183 |
| 2016/0290603 A1* | 10/2016 | Morello | ............ | F21V 13/02 |
| 2016/0348862 A1* | 12/2016 | Liang | ............ | F21V 5/007 |
| 2016/0363288 A1* | 12/2016 | McKendry | ............ | B60Q 1/2696 |
| 2017/0036591 A1* | 2/2017 | Chen | ............ | B60Q 1/0052 |
| 2017/0211750 A1* | 7/2017 | Yotsumoto | ............ | F21S 2/00 |
| 2017/0227208 A1* | 8/2017 | Bendtsen | ............ | F21V 17/16 |
| 2017/0254525 A1* | 9/2017 | Klafta | ............ | F21K 9/233 |
| 2017/0356628 A1* | 12/2017 | Lee | ............ | F21S 43/14 |
| 2019/0003660 A1* | 1/2019 | Jang | ............ | F21S 2/005 |
| 2019/0277488 A1* | 9/2019 | Shum | ............ | F21V 23/005 |

FOREIGN PATENT DOCUMENTS

| | | |
|---|---|---|
| CN | 105026831 A | 11/2015 |
| CN | 105202394 A | 12/2015 |
| CN | 105627171 A | 6/2016 |
| CN | 205402340 U | 7/2016 |
| JP | 3164259 U | 11/2010 |

* cited by examiner

US 10,914,452 B2

OPTICAL ELEMENT, LIGHT SOURCE CIRCUIT AND LIGHTING DEVICE

CROSS-REFERENCE TO RELATED APPLICATIONS

This application is based upon and claims the priority of PCT patent application No. PCT/CN2017/073612 filed on Feb. 15, 2017 which claims the priority of Chinese Patent Application No. 201610128753.X filed on Mar. 07, 2016, and Chinese Patent Application No. 201620172136.5 filed on Mar. 07, 2016, the entire content of all of which is hereby incorporated by reference herein for all purposes.

TECHNICAL FIELD

The present disclosure relates to the technical field of semiconductor illumination, and particularly to an optical element, a light source circuit and a lighting device.

BACKGROUND

With rapid development of the semiconductor illumination technology, an existing Light-Emitting Diode (LED) lighting fixture, such as a LED ceiling lamp, has been widely applied in indoor spaces.[SW1]

SUMMARY

The present disclosure provides a light source circuit which is applied in a lighting fixture and can enable the lighting fixture to achieve an effect of emitting light uniformly.

A light source circuit is provided. The light source circuit may include a substrate, a light source mounted on a surface of the substrate, and an optical element assembled on the substrate, where the substrate may be provided with a first light source connection region and a second light source connection region; the optical element may be provided with a first lens corresponding to the first light source connection region and may be provided with a plurality of second lenses corresponding to the second light source connection region; and the light source at least may include a first light source arranged on the first light source connection region.

A lighting device is also provided. The lighting device may include a light source circuit and a shell for accommodating the light source circuit, where the light source circuit may include a substrate, a light source mounted on a surface of the substrate, and an optical element assembled on the substrate, where: the substrate may be provided with a first light source connection region and a second light source connection region; the optical element may be provided with a first lens corresponding to the first light source connection region and may be provided with a plurality of second lenses corresponding to the second light source connection region; and the light source at least may include a first light source arranged on the first light source connection region.

Further, an optical element is provided for performing a light distribution to light emitted from a light source. The optical element may include an integrally extending first lens, and a plurality of second lenses distributed at a periphery of the optical element, where: the first lens may be provided with a first light source accommodation groove, and the second lens may be provided with a second light source accommodation groove.

It is to be understood that, both the foregoing general description and the following detailed description are exemplary and explanatory only and are not restrictive of the present disclosure.

BRIEF DESCRIPTION OF THE DRAWINGS

Upon a review of detailed description of preferred examples below, various other advantages and benefits will become apparent for those skilled in the art. The drawings are only for the purpose of illustrating the preferred examples, but not limitative of the present disclosure. Moreover, throughout the drawings, the same reference signs denote the same parts. In the drawings.

The drawings illustrated herein are used for providing further understanding to the present disclosure and constitute a part of the present disclosure. Examples of the present disclosure and illustration thereof are used for explaining the present disclosure, but not intended to improperly define the present disclosure. In the drawings.

Figure 1:
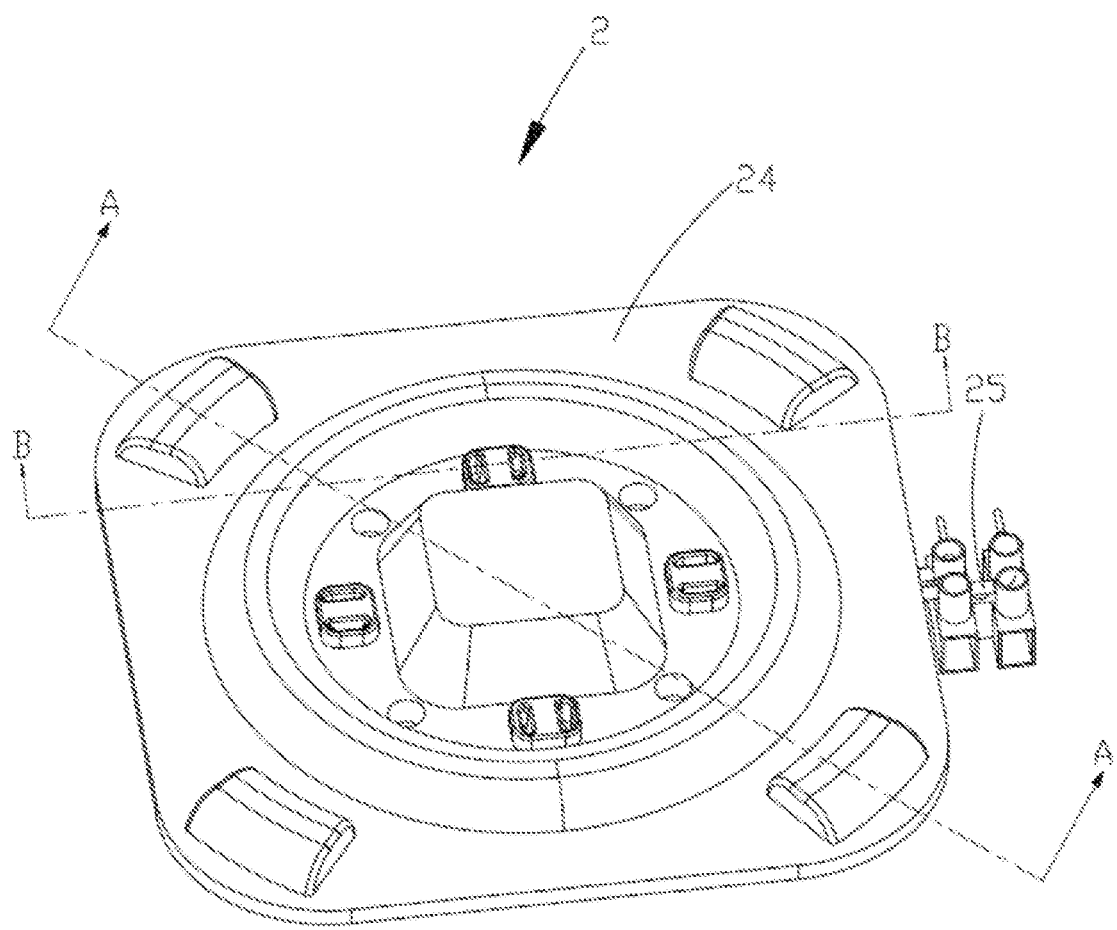
FIG. 1 is a stereoscopic assembled view of a light source module provided by Example I of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make object(s), technical solution(s) and advantage(s) of the present disclosure apparent, the technical solution(s) of the present disclosure will be described in a clearly and fully understandable way in connection with the examples of the present disclosure and corresponding drawings. The described examples are just a part but not all of the examples of the disclosure. Based on the described examples herein, those skilled in the art can obtain other example(s), without any inventive work, which should be within the scope of the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The LED lighting fixture may include a lamp housing, a light source module located in the lamp housing, and a driving power supply module located in the lamp housing and electrically connected with the light source module. The light source module generally includes a substrate, a plurality of LED light-emitting units arranged on the substrate, and a light distribution element corresponding to the plurality of LED light-emitting units. The light distribution element is provided with lenses which are arranged in one-to-one correspondence with the plurality of LED light-emitting units. The lens can adjust a direction of illumination light emitted by a corresponding LED light-emitting unit.

However, sometimes, an arrangement between the LED light-emitting unit and the lens in the LED lighting fixture has been fixed, which makes it impossible to achieve a lighting fixture satisfying demands for emitted light in terms of both illumination intensity and uniformity by adjusting a power and an amount of the LED light-emitting unit.

Due to modular design of each component in the existing lighting fixture, the above-mentioned light source module can also be applied to shells of different lighting fixtures. However, in some cases, it may involve the problem that light emitted from the LED light-emitting units in the light source module still cannot uniformly cover a light emergent surface of the lamp housing after a light distribution through the lenses. For example, a corner or edge portion of the lamp housing of the lighting fixture is relatively darker, and thus, such a lighting fixture involves the problem that an emission effect is poor. The present disclosure provides examples to address the problem.

Example I

Figure 2:
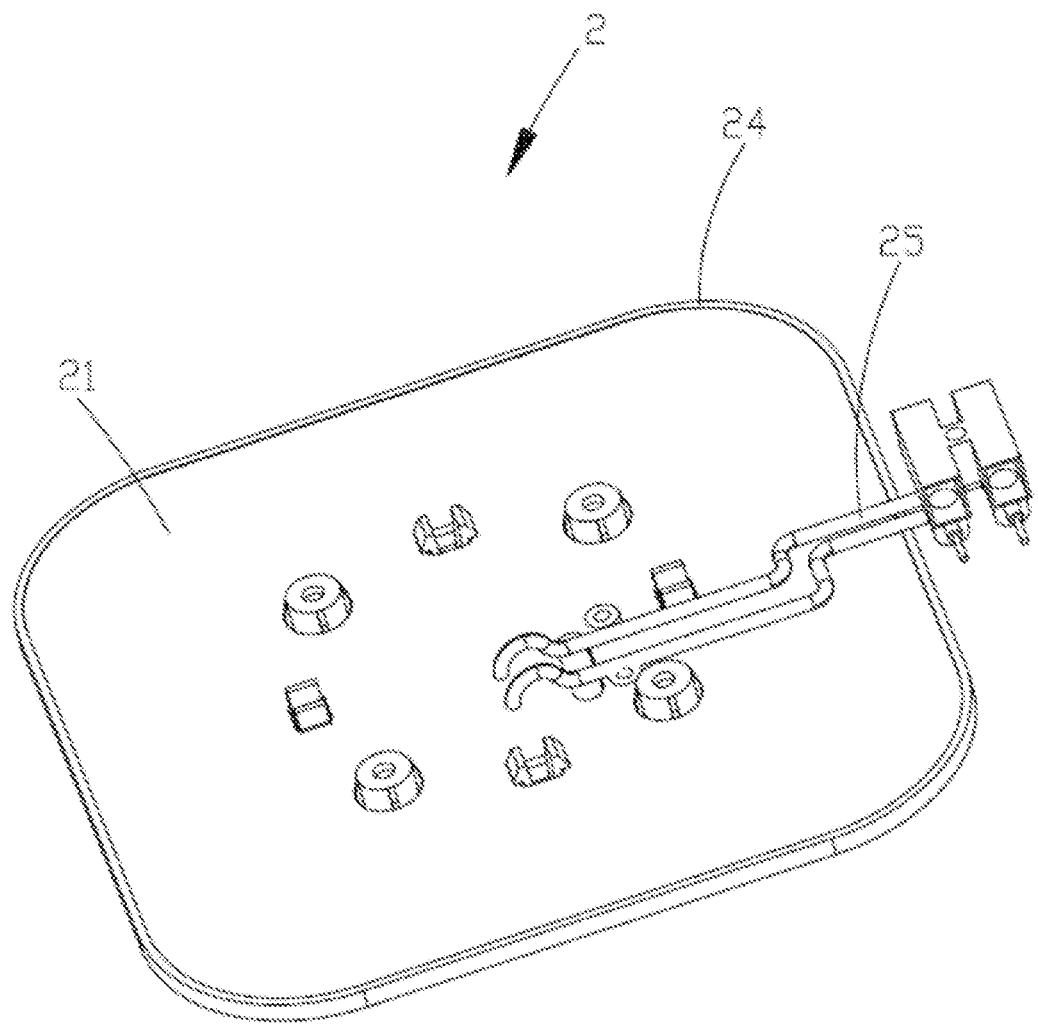
FIG. 2 is a stereoscopic assembled view of the light source module as provided by Example I of the present disclosure, from another perspective.

FIG. 1 and FIG. 2 illustrate a light source module 2 provided by Example I of the present disclosure. As illustrated in FIGS. 3-6, the light source module 2 includes a substrate 21, a plurality of light sources 22 arranged on the substrate 21, a driving power supply (not illustrated in the drawings) arranged on the substrate and electrically connected with the light sources 22, an integrated optical element 24 located above the substrate 21, and a cable 25 electrically connected to the substrate 21.

A structure and a connection relationship of each component in the light source module 2 will be described in more details below.

Figure 3:
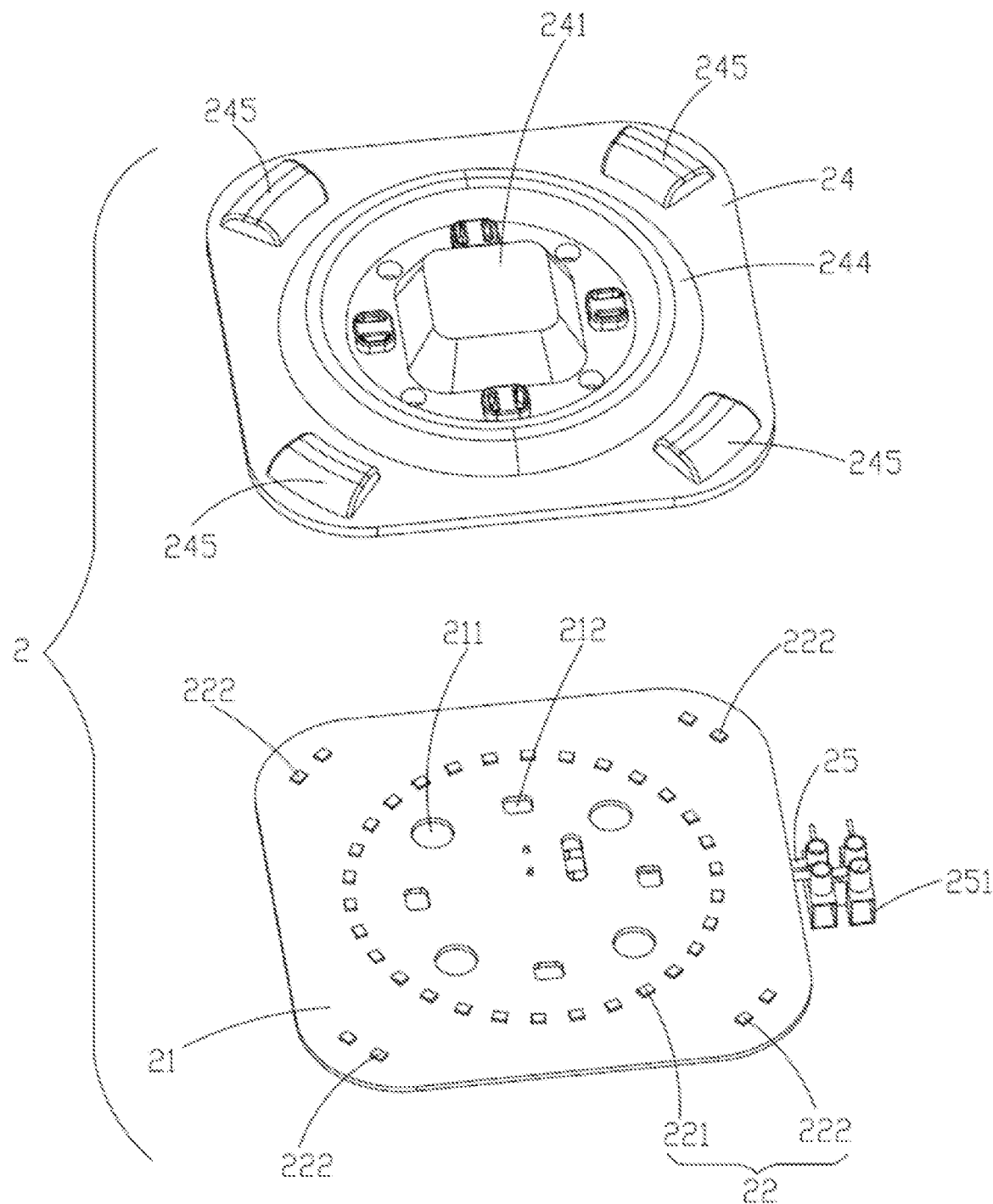
FIG. 3 is a stereoscopic exploded view of FIG. 1.
Figure 6:
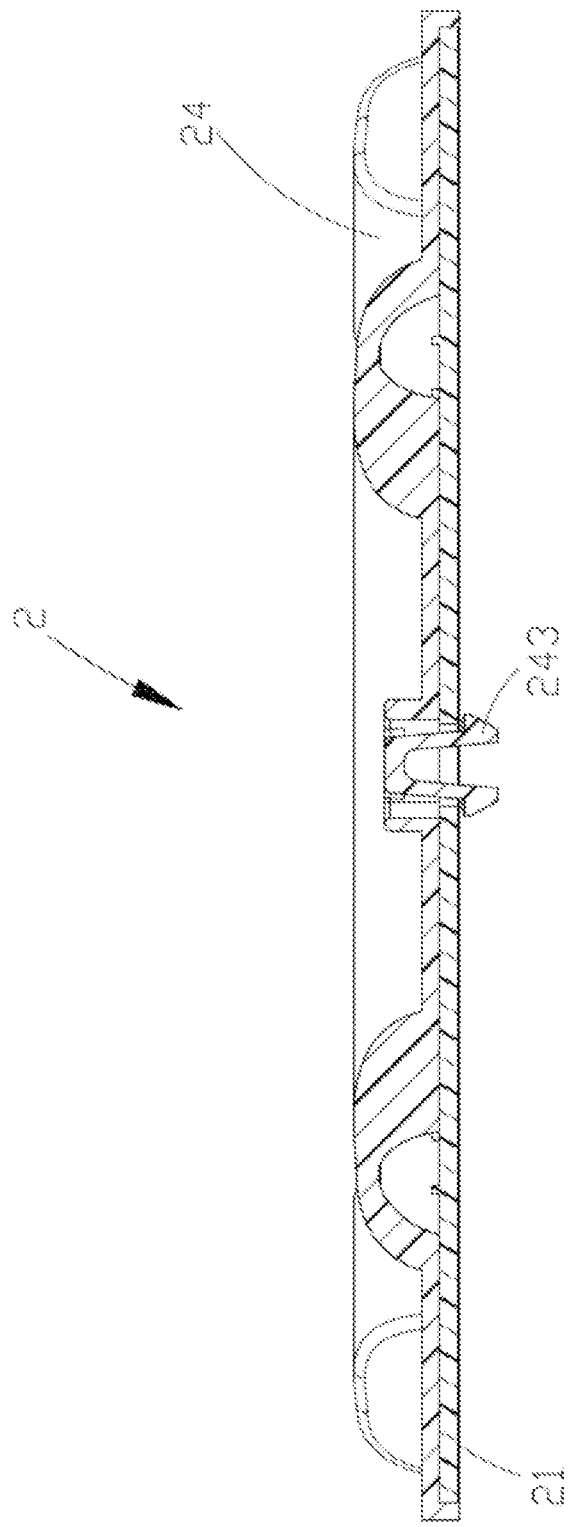
FIG. 6 is a sectional view taken along a B-B line in FIG. 1.

As illustrated in FIG. 3 and FIG. 6, the substrate 21 can be a printed circuit board (PCB), and the PCB is provided with a conductive line (not illustrated in the drawings) and a light source connection region (unmarked) for connecting the light source 22. The light source connection region is just where the light source 22 is located on the substrate 21. A configuration of the substrate 21 in a horizontal plane is substantively the same with that of the optical element 24; the substrate 21 is of a square shape, and four corners of the substrate 21 are all rounded corners. The substrate 21 is provided with four first through holes 211 and four second through holes 212 which are matched with the optical element 24, and the first through holes 211 and the second through holes 212 are distributed in a staggered mode in a circumferential direction. It should be noted that the above-mentioned light source connection region includes a first light source connection region and a second light source connection region; the first light source connection region is of a circular ring shape and located at peripheries of the first through holes 211 and the second through holes 212; the second light source connection region is located at a periphery of the first light source connection region and distributed on the four corners of the substrate 21, and the second light source connection region is located at an outer side of the first light source connection region. The first light source connection region and the second light source connection region are arranged at an interval and are electrically connected. The first light source connection region can include a plurality of light source welding points, the second light source connection region also includes a plurality of light source welding points, and the light source 22 can be arranged on both the first and second light source connection regions. Of course, the second light source connection region can also be arranged in an edge region on the substrate 21 except the corner regions.

Figure 5:
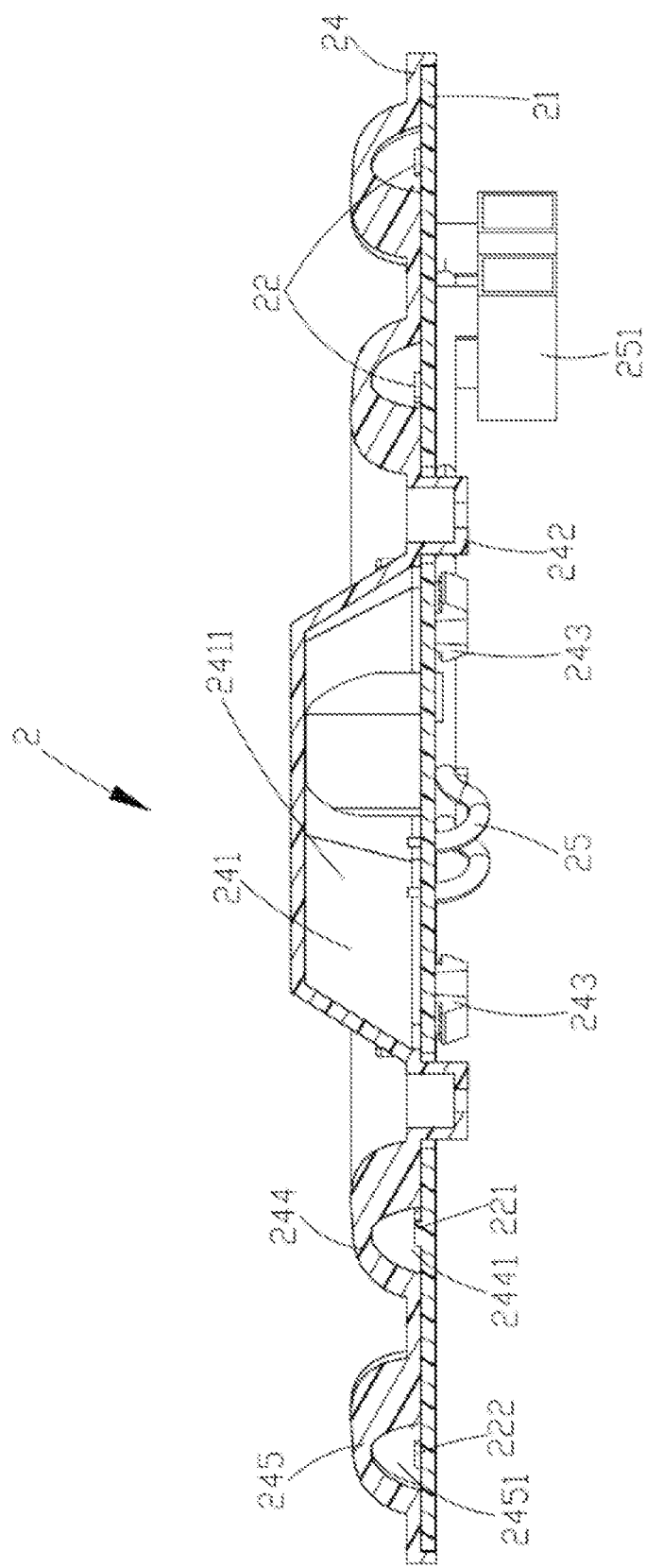
FIG. 5 is a sectional view taken along a A-A line in FIG. 1.

As illustrated in FIG. 3 and FIG. 5, the light source 22 includes a plurality of LED light-emitting units, and can be mounted in the light source connection region (not illustrated in the drawings) on an upper surface of the substrate 21 by a Surface Mount Technology (SMT) or a Through Hole Technology (THT), so that the light source connection region is covered by the light source 22. By means of conductive lines on the substrate 21, the plurality of light-emitting units are electrically connected with each other. Further, the light source 22 includes a first light source 221 electrically connected to the first light source connection region and a second light source 222 electrically connected to the second light source connection region; the first light source 221 includes a plurality of LED light-emitting units, the LED light-emitting units are distributed along the circumferential direction and arranged at peripheries of the first through holes 211 and the second through holes 212. The second light source 222 also includes a plurality of LED light-emitting units, the LED light-emitting units are arranged in the second light source connection region on four corners of the substrate 21.

The driving power supply can drive the light source 22 to emit light and includes a plurality of components, including but not limited to, a LED driving controller chip, a rectification chip, a resistor, a capacitor, a fuse, a coil and the like. The driving power supply can be arranged on an upper surface and/or a lower surface of the substrate 21 by a paste or an inserter, or combination of the paste and the inserter. Preferably, the driving power supply can be arranged at a central position of the upper surface of the substrate 21, which design takes full advantage of a space on the substrate 21 and achieves an effect of reducing a size of the substrate 21.

As illustrated in FIGS. 3-6, the integrated optical element 24 is integrally formed by a transparent insulation material, such as polycarbonate (PC) and polymethyl methacrylate (PMMA). The optical element 24 is used for performing a secondary light distribution to the light emitted by the light source 22. The optical element 24 is roughly of a square shape, and a configuration of the optical element 24 in the horizontal plane is substantively the same with that of the substrate 21. Also, four corners of the optical element 24 are all rounded corners. It should be noted that, the above-mentioned shape of the optical element 24 merely is used for exemplary illustration but is not limitative. For example, it can also be a shape of rectangle, hexagon and the like.

Figure 4:
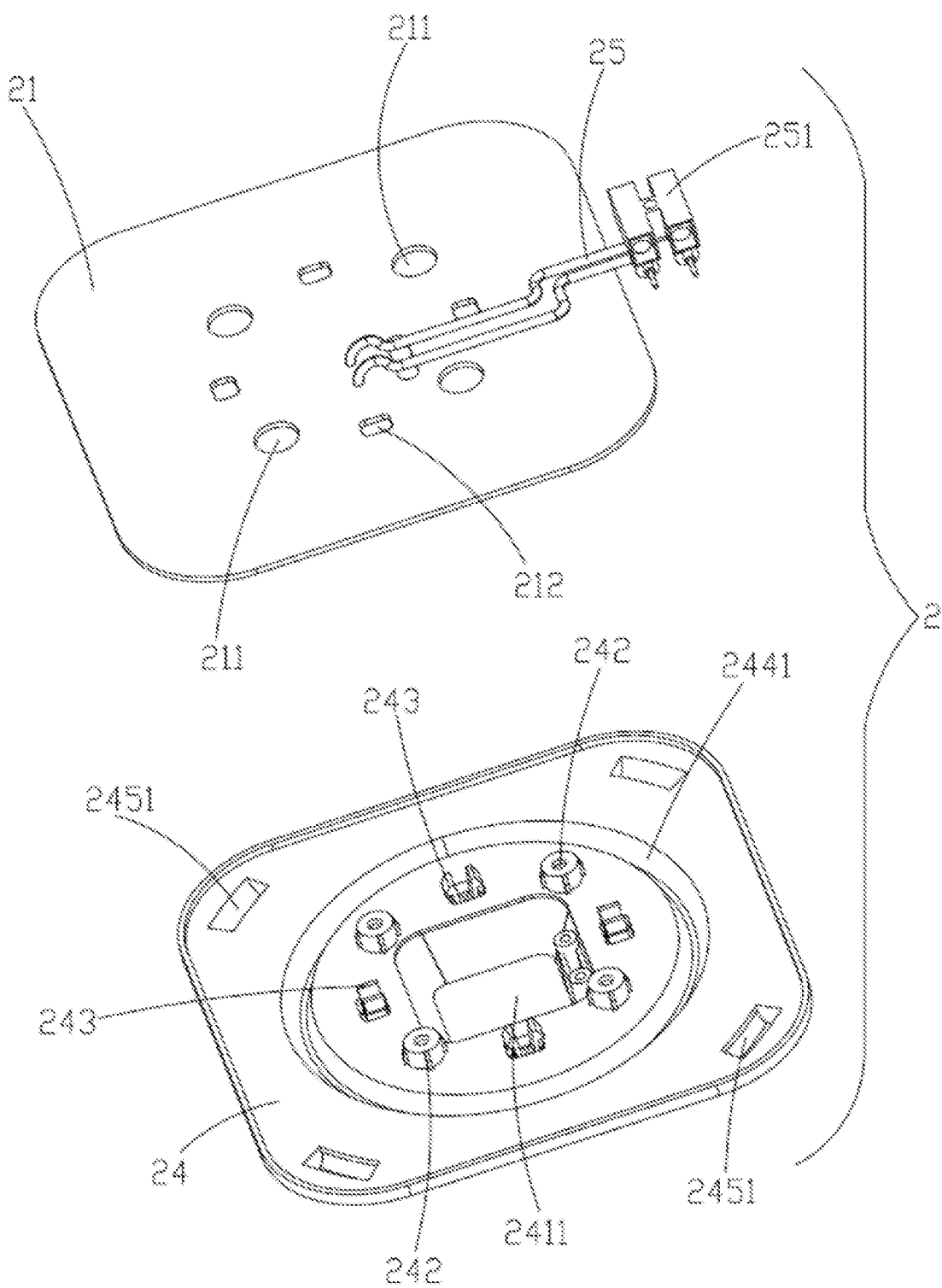
FIG. 4 is a stereoscopic exploded view of FIG. 2.

As illustrated in FIGS. 3-5, a middle region of the optical element 24 is arched up from a lower surface of the optical element 24 to form a protrusion portion 241, and a groove 2411 is formed in the protrusion portion 241 to accommodate the driving power supply. Therefore, the protrusion portion 241 can be referred to as a driving power supply accommodation region.

As illustrated in FIGS. 3-6, the optical element 24 is further provided with four first positioning pillars 242 which can pass through the first through holes 211 in the substrate 21, and four first buckling portions 243 which can be matched with the second through holes 212 in the substrate 21. Particularly, the first buckling portion 243 can pass through the second through hole 212 and locked onto a lower surface of the substrate 21; by means of the above-mentioned cooperation, the optical element 24 and the substrate 21 are positioned and connected together.

The optical element 24 is provided with one first optical region 244 and four second optical regions 245, which are arched up from the lower surface of the optical element 24 and used for performing the secondary light distribution. The first optical region 244 corresponds to the first light source 221, and the second optical region 245 corresponds to the second light source 222.

Particularly, the first optical region 244 is a ring-shaped lens, and can be referred to as a first lens. A groove 2441 that is opened downward and has a circular ring shape is formed in the first optical region 244, and the first light source 221 on the substrate 21 is located below the first optical region 244 of the optical element 24 and corresponds to the groove 2441, so that the first light source 221 can be regarded as being accommodated in the groove 2441. Therefore, the groove 2441 can also be referred to as a first light source accommodation groove. A cross-section of the first optical region 244 in an extension direction thereof has a fixed shape. The groove 2441 internally has a bottom surface 2442 which is an arched, curved surface, and the bottom surface 2442 is a light incident surface. The first optical region 244 has an upper surface 2443 which is an arched, curved surface, and the upper surface 2443 is a light emergent surface. A curvature of the light incident surface 2442 is greater than a curvature of the light emergent surface 2443, i.e., the light incident surface 2442 is more curving than the light emergent surface 2443.

Figure 7:
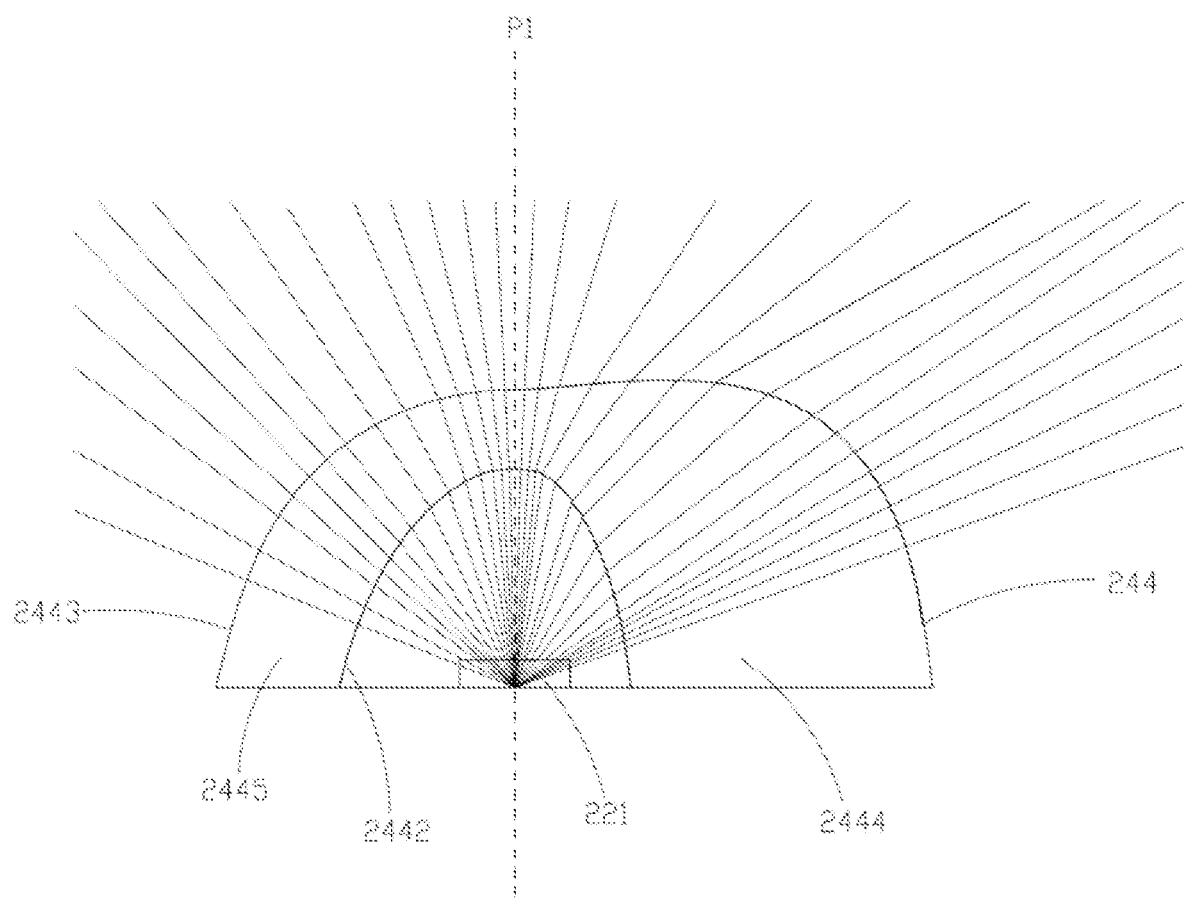
FIG. 7 is a diagram of an optical path corresponding to a ring-shaped lens in an optical element of the light source module as illustrated in FIG. 5.

As illustrated in FIG. 7, in Example I of the present disclosure, the first optical region 244 has a central annular surface P1; the central annular surface P1 is perpendicular to a round-shaped curve where the first light source is located, and extends along the round-shaped curve. It should be explained that, the first optical region 244 is divided into two portions along the central annular surface, which respectively are an inner portion 2444 and an outer portion 2445; a thickness of the inner portion 2444 is greater than a thickness of the outer portion 2445. As illustrated in FIG. 7, after the light emitted from the first light source 221 is subjected to a light distribution by the first optical region 244, part of the light is refracted by the light incident surface 2442 and the light emergent surface 2443 at the outer portion 2445 so as to be diffused towards the outside of the optical element 24, and part of the light is refracted by the light incident surface 2442 and the light emergent surface 2443 at the inner portion 2444 so as to be diffused towards the center of the optical element 24.

The first optical region 244 is relatively closer to the edge of the optical element 24, and thus, when passing through the outer portion 2445, part of the light does not need to be excessively diffused outwards, so as to avoid a light loss. Meanwhile, when passing through the inner portion 2444, part of the light not only doesn't need to be excessively refracted inwards to cause an excessively bright middle region, but also doesn't need to be excessively refracted outwards to cause an excessively dark middle region.

Therefore, with the above-mentioned design of the cross-sectional shape of the first optical region 244, the light emitted from the first light source 221 is uniformly distributed in some regions of the mask 3 excluding the optical element 24, e.g., a region outside a peripheral region, after being subjected to a light distribution by the first optical region 244. In other alternative examples, the first optical region 244 can also be properly and externally expanded towards a direction of the peripheral region of the optical element 24 so as to satisfy the demands on the uniformity of the light in the peripheral or boundary region of the optical element 24.

As illustrated in FIGS. 3-5, four second optical regions 245 are distributed on four corners of the optical elements 24, each second optical region 245 is of an arc shape, and each second optical region 245 is an arc lens. Each second optical region 245 can become one second lens. The second optical region 245 is also provided with a groove 2451 which is opened downwards and has an arc shape, and the second light source 222 on the substrate 21 is located below the second optical region 245 of the optical element 24 and corresponds to the groove 2451, so that the second light source 222 can be regarded as being accommodated in the groove 2451. Thus, the groove 2451 can also be referred to as a second light source accommodation groove. A cross-section of the second optical region 245 in an extension direction thereof has a fixed shape, which is as same as the cross-sectional shape of the first optical region 244. Therefore, a structure of the second optical region 245 will not be described in detail herein.

As illustrated in FIGS. 1-5, one end of the cable 25 is connected to the substrate 21 and is electrically connected with the driving power supply on the substrate 21, and the other end of the cable 25 can be connected with an external power supply. The cable 25 is further provided with a cable arrangement apparatus 251 which is matched with the second buckling portion 122 and the second positioning pillar 121 on the bottom wall 12 of the base 1 so that the cable arrangement apparatus 251 can be positioned on the base 1, and thus, the cable 25 can also be well arranged and positioned.

Example II

Figure 8:
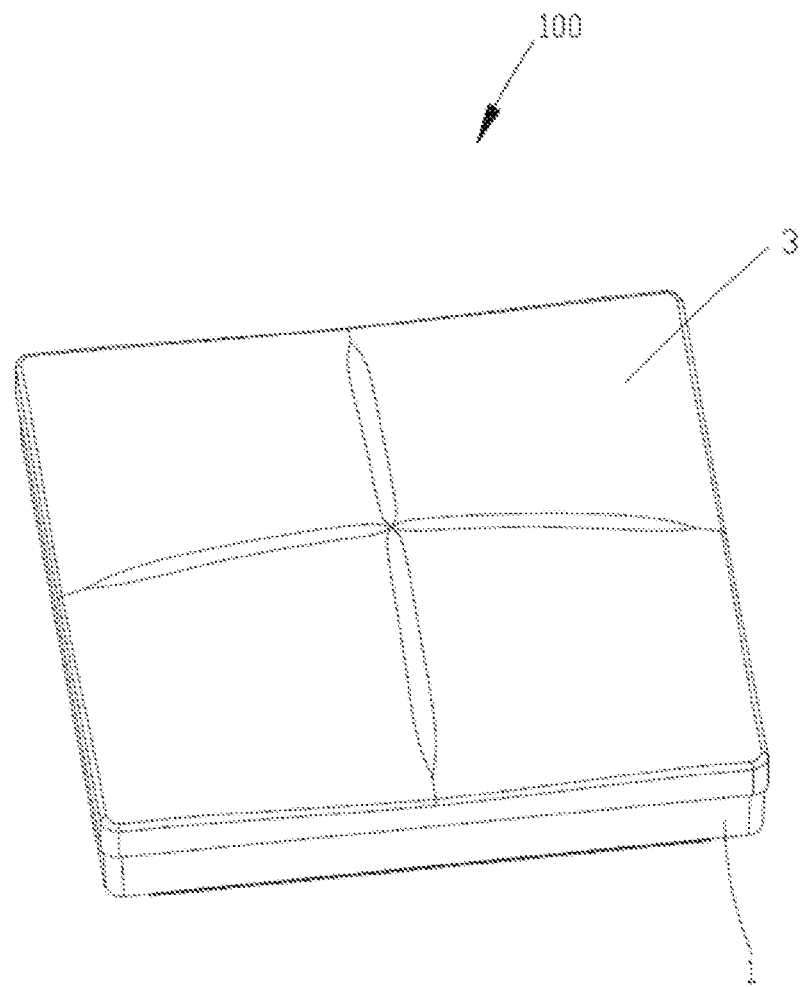
FIG. 8 is stereoscopic assembled view of a lighting device provided by Example II of the present disclosure.
Figure 9:
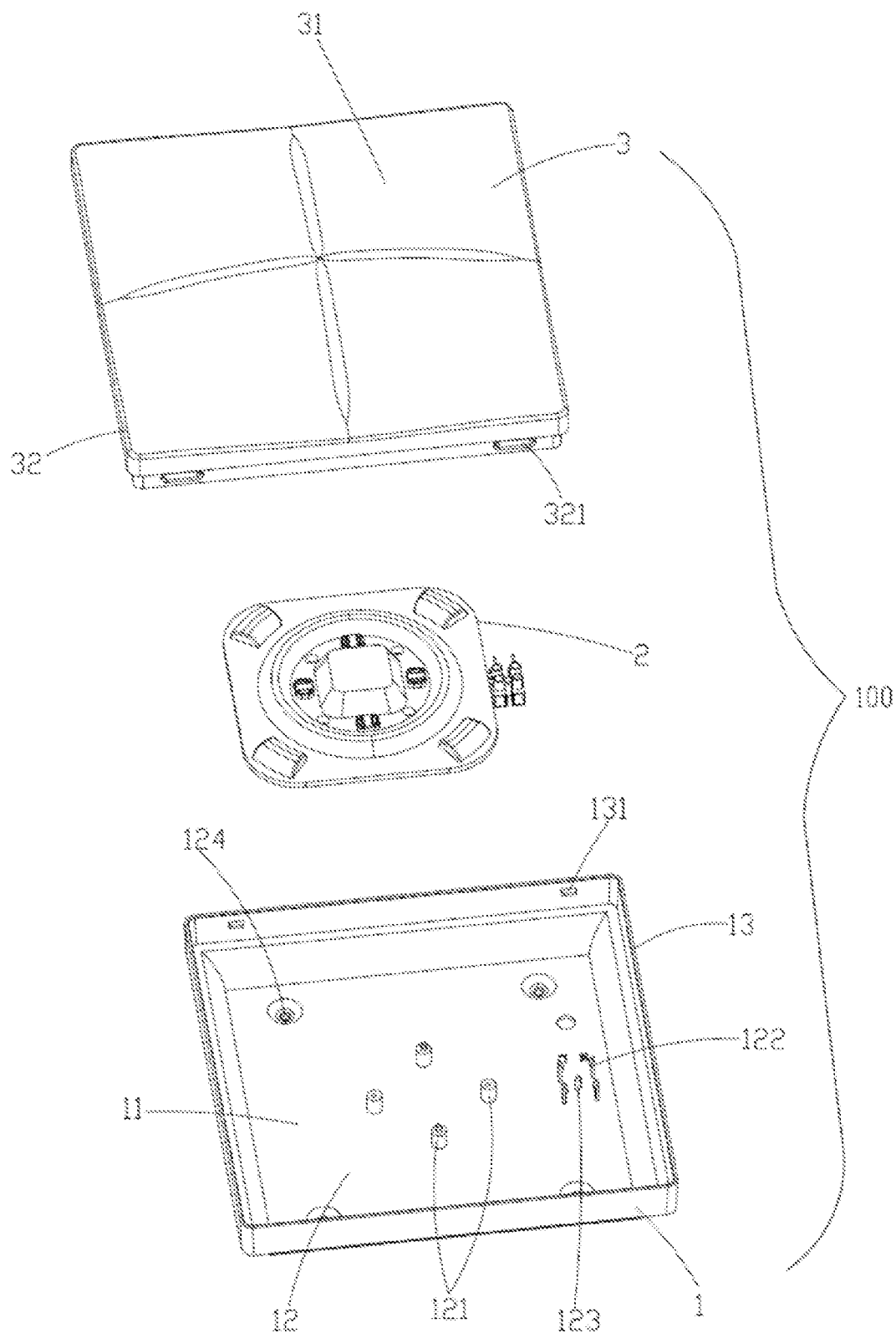
FIG. 9 is a stereoscopic exploded view of the lighting device provided by Example II of the present disclosure.

FIG. 8 and FIG. 9 illustrate a lighting device 100 provided by Example II of the present disclosure. As illustrated in FIG. 8 and FIG. 9, the lighting device 100 includes: a base 1, a light source module 2 accommodated in the base 1, and a mask 3 which is assembled at an open end of the base 1 and seals up the light source module 2. A combination of the base 1 and the mask 3 is a shell of the lighting device 100.

Hereinafter, a structure and a connection relationship of each component in the lighting device 100 will be described in more details below.

As illustrated in FIG. 8 and FIG. 9, the base 1 is of a rectangular shape, and is made of a plastic material, such as PC. The base 1 is provided with an accommodation cavity 11 which can accommodate the light source module 2. The base 1 includes a bottom wall 12 and four first side walls 13. An inner surface of the bottom wall 12 of the base 1 is provided with four second positioning pillars 121 for positioning the light source module 2, four second buckling portions 122, and one third positioning pillar 123. The inner surface of the bottom wall 12 of the base 1 is further provided with four mounting holes 124 for positioning the base 1 on a mounting foundation (not illustrated in the drawings). Moreover, the first side wall 13 of the base 1 is provided with a positioning block 131 for positioning the mask 3.

As illustrated in FIG. 8 and FIG. 9, the mask 3 is also of a rectangular shape, and is made of a plastic material, such as a PC or PMMA. The mask 3 includes a non-opaque top wall 31, and a second side wall 32 connected with the first side wall 13 of the base 1. The second side wall 32 is provided with a groove 321 which is matched with the positioning block 131. When the mask 3 is assembled on the base 1, the positioning block 131 of the first side wall 13 is accommodated in the groove 321 of the second side wall 32 so as to implement a connection between the mask 3 and the base 1.

It should be explained that, the first positioning pillars 242 on the optical element 24 correspond to the second positioning pillars 121 on the base 1. The first positioning pillars 242 each are a hollow pillar; and two of the second positioning pillars 121 are hollow pillars and the other two of the second positioning pillars 121 are solid pillars. Therefore, by a mutual cooperation between the hollow first positioning pillars 242 and the solid second positioning pillars 121, it can achieve pre-positioning. A fixed connection between the hollow first positioning pillars 242 and the hollow second positioning pillars 121 can be implemented by screws (not illustrated in the drawings), so that a fixed connection is also implemented between the light source module 2 and the base 1. In other alternative examples, by a magnetic mounting element (not illustrated in the drawings) mounted on the light source module 2, a rapid connection and disassembling between the light source module 2 and the base 1 of the lighting device 100 can also be implemented. The above-mentioned magnetic mounting element can be a permanent magnet, or a combination of a permanent magnet with a non-magnetic material. From another perspective, the above-mentioned magnetic mounting element namely can be mounted on the optical element 24.

From the above, the light source module 2 can be applied in the lighting device 100 in a detachable mode, as an independent component. A first light source 221 of the light source module 2 is a main light source, and after passing through a first optical region 244, light emitted from the first light source 221 is uniformly distributed in most of the regions of the mask 3, excluding regions of four corners of the mask 3. A second light source 222 of the light source module 2 is an auxiliary light source, and is arranged on four corners of a substrate 21 and correspond to the four corners of the mask 3, so that after passing through a second optical region 245, light emitted from the second light source 222 is also uniformly distributed in regions of the four corners of the mask 3. By the arrangement of the second light source 222 and the second optical region 245, the problem in the related art that there is a region covered by neither the first light source 221 nor the first optical region 244 can be solved. Therefore, the light emitted from the first light source 221 and the second light source 222 can be uniformly distributed on the mask 3 after being subjected to a light distribution by the optical element 24.

Example III

Figure 10:
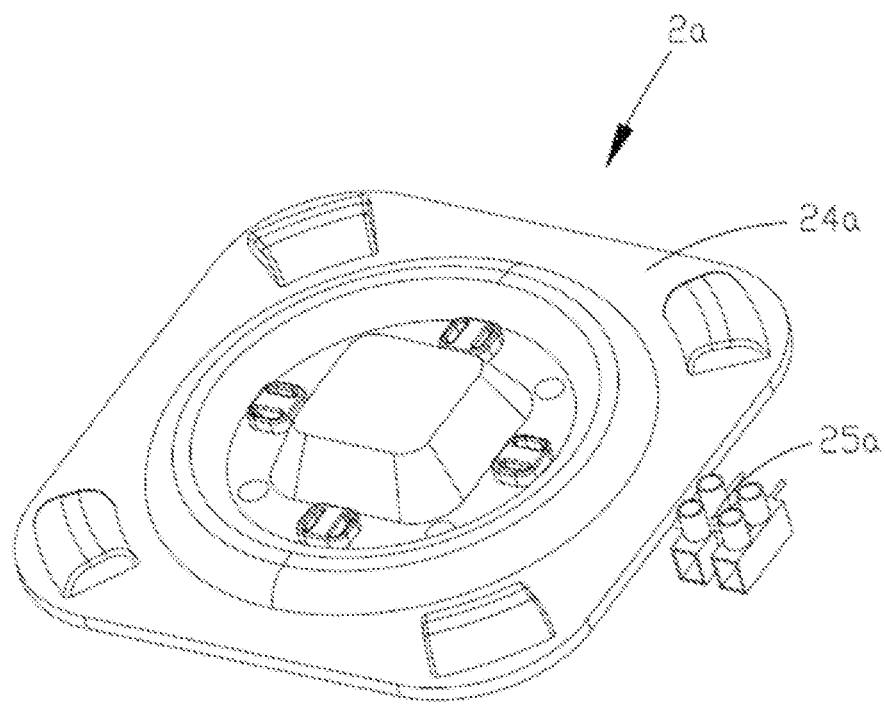
FIG. 10 is a stereoscopic assembled view of a light source module provided by Example III of the present disclosure.
Figure 11:
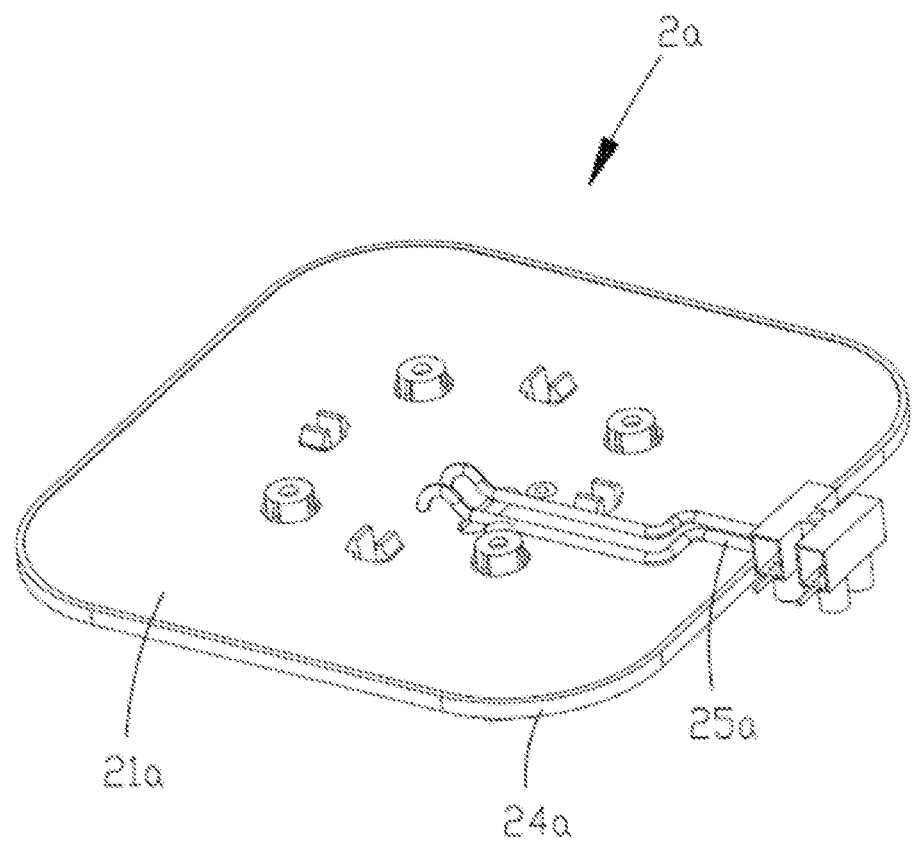
FIG. 11 is a stereoscopic assembled view of the light source module as provided by Example III of the present disclosure, from another perspective.
Figure 12:
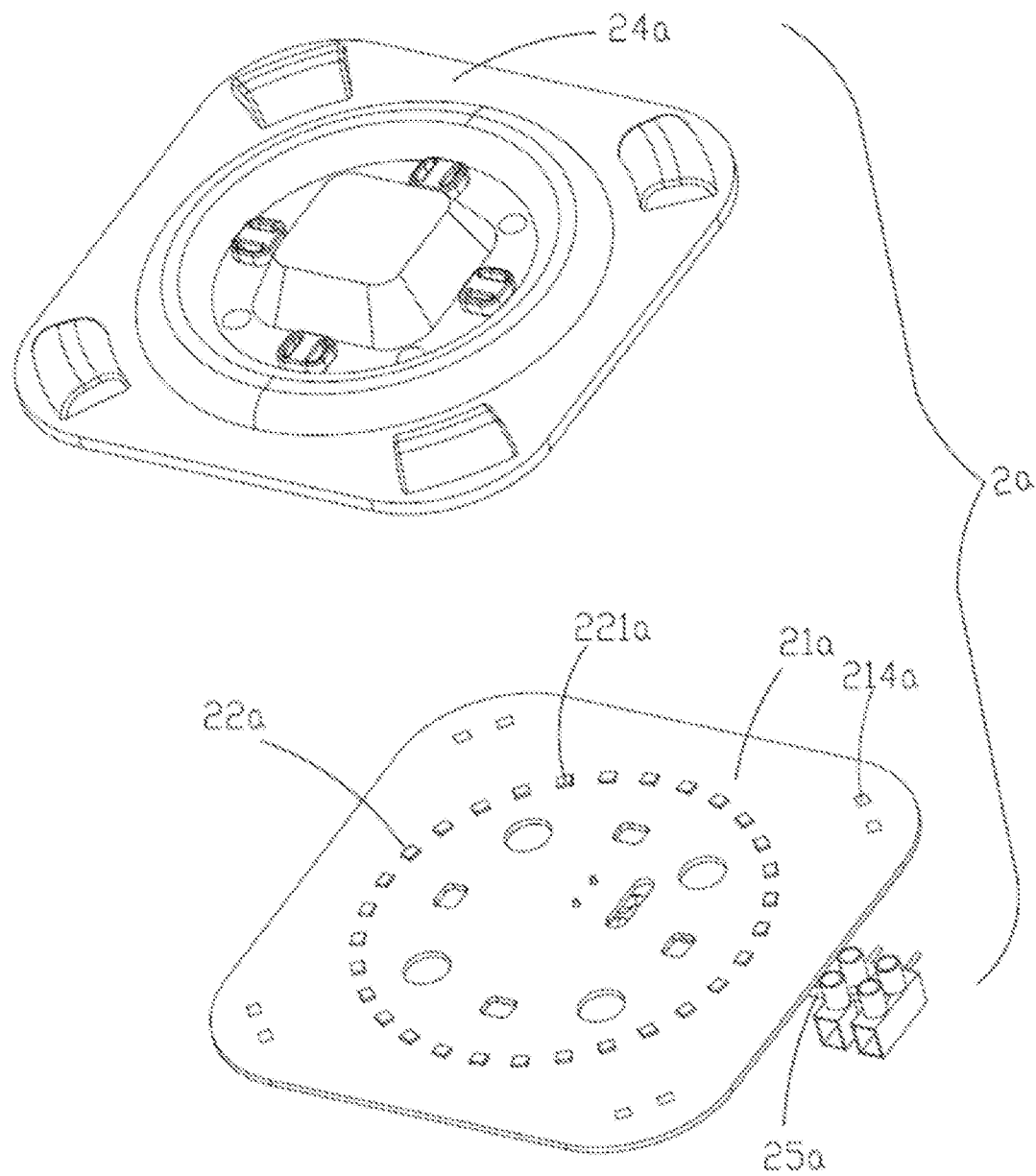
FIG. 12 is a stereoscopic exploded view of FIG. 10.
Figure 13:
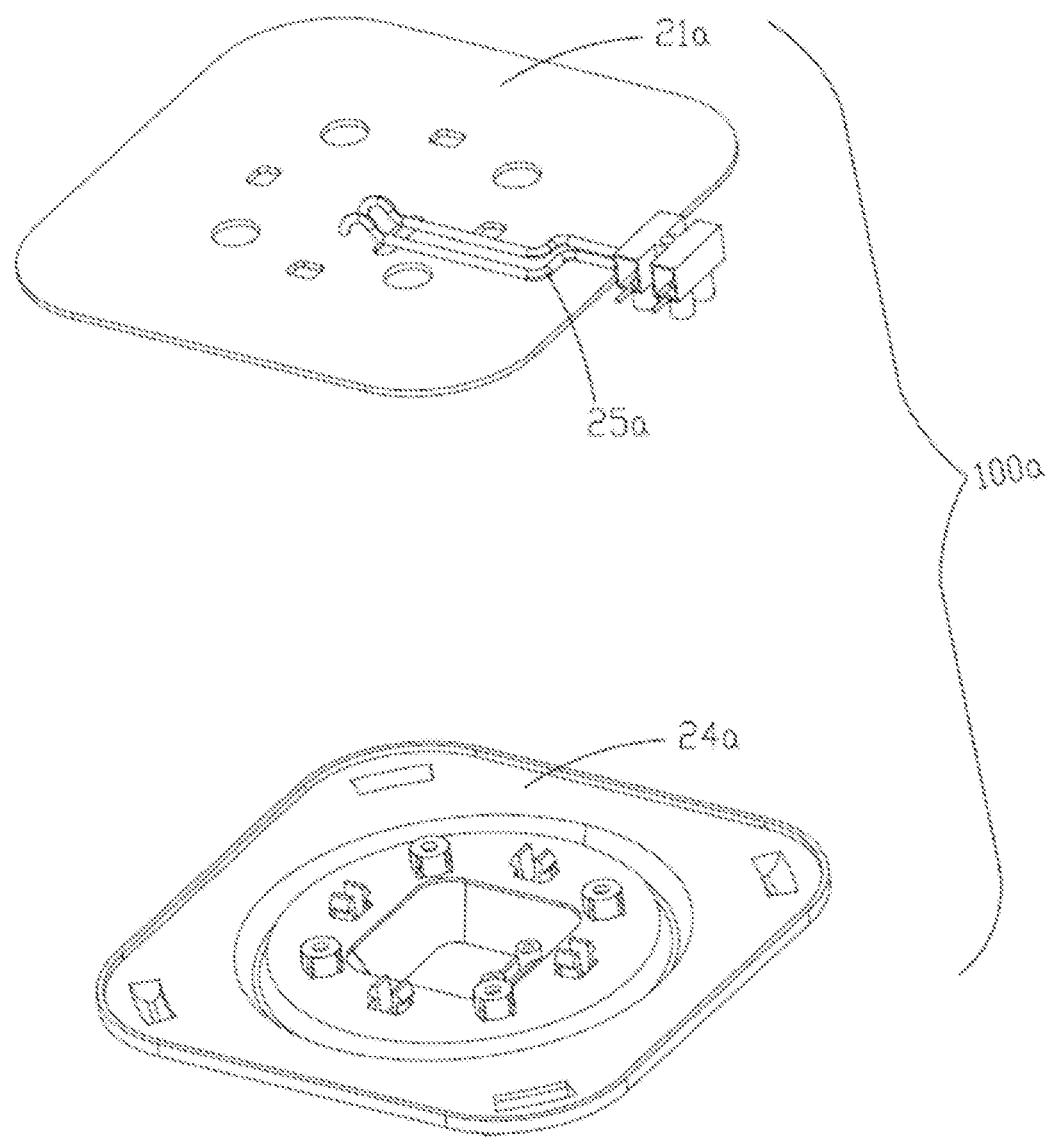
FIG. 13 is a stereoscopic exploded view of FIG. 11.

FIG. 10 and FIG. 11 illustrate a light source module 2a provided by Example III of the present disclosure. As illustrated in FIG. 12 and FIG. 13, the light source module 2a includes a substrate 21a, a plurality of light sources 22a arranged on the substrate 21a, a driving power supply (not illustrated in the drawings) arranged on the substrate 21a and electrically connected with the light sources 22a, an integrated optical element 24a located above the substrate 21a, and a cable 25a electrically connected to the substrate 21a. Meanwhile, the optical element 24a on the light source module 2a is also used as an electrical insulation shell, so that a safety level is improved.

It should be explained that, the substrate 21a and the optical element 24a in the light source module 2a provided by Example III of the present disclosure, respectively, have the same structures with the substrate 21 and the optical element 24 in the light source module 2 provided by Example I of the present disclosure. For example, the substrate 21a is also provided with a first light source connection region (not illustrated in the drawings) and a second light source connection region 214a.

The light source 22a only includes a first light source 221a arranged in the first light source connection region, and no second light source is arranged on the second light source connection region 214a.

Example IV

Figure 14:
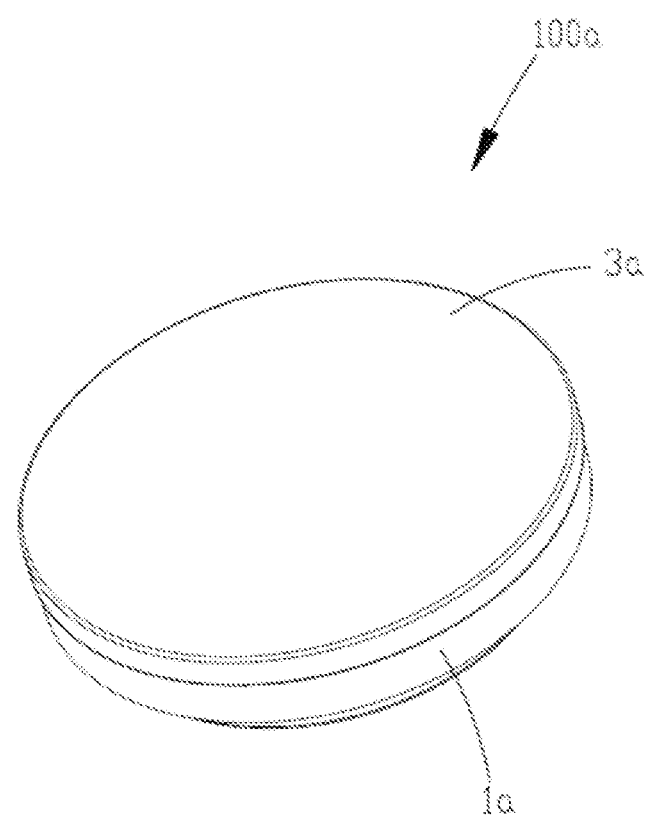
FIG. 14 is a stereoscopic assembled view of a lighting device provided by Example IV of the present disclosure.
Figure 15:
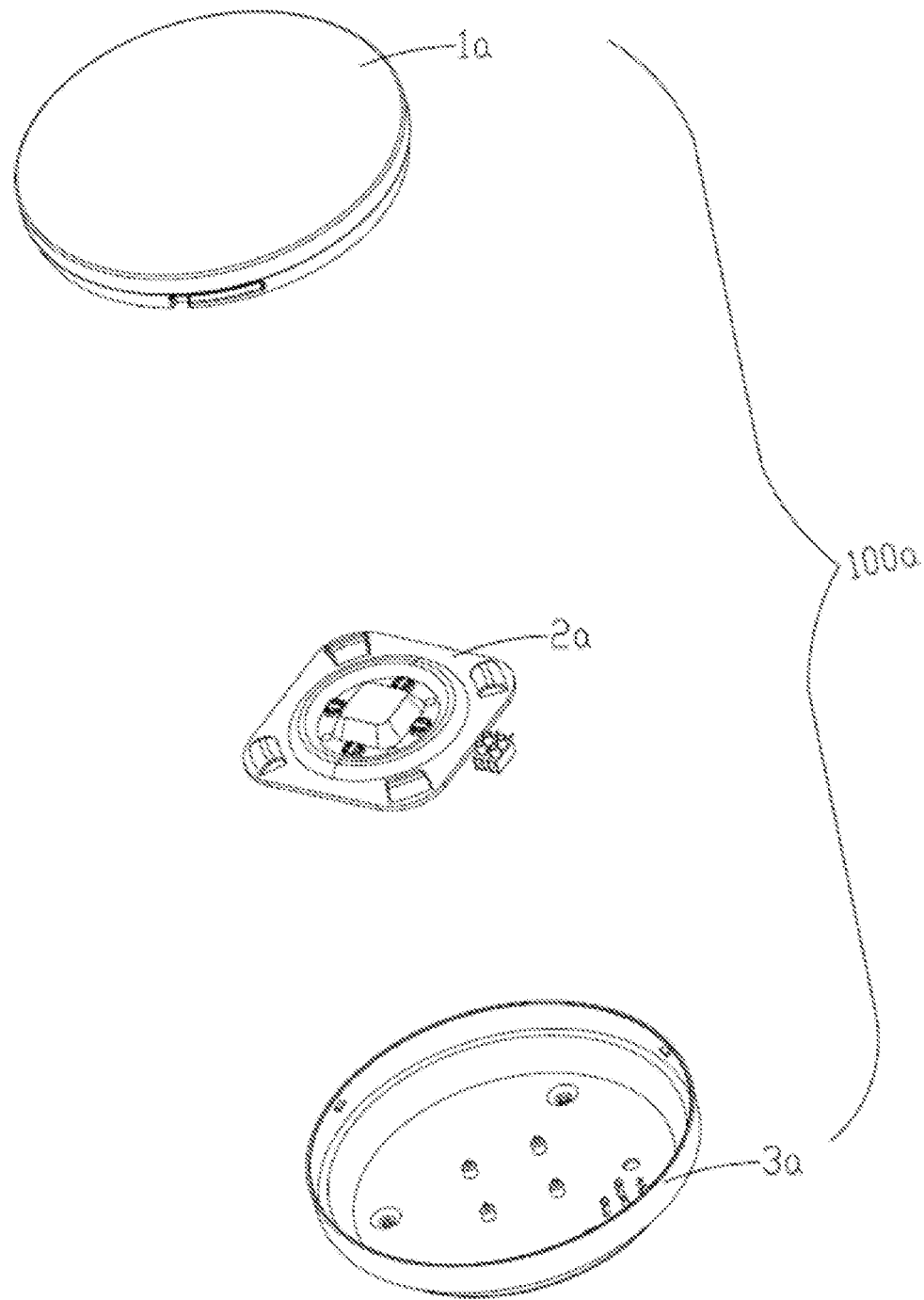
FIG. 15 is a stereoscopic exploded view of the lighting device provided by Example IV of the present disclosure.

FIG. 14 and FIG. 15 illustrate a lighting device 100a provided by Example IV of the present disclosure. As illustrated in FIG. 14 and FIG. 15, the lighting device 100a includes: a base 1a, a light source module 2a accommodated in the base 1a, and a mask 3a which is assembled at an open end of the base 1a and seals up the light source module 2a. A combination of the base 1a with the mask 3a is a shell of the lighting device 100a.

It should be explained that, the base 1a and the mask 3a are of a circular shape, and thus, light emitted from a first light source 221a in the light source module 2a of the lighting device 100a can be uniformly distributed on the mask 3a after being subjected to a light distribution of a first optical region 244a. Therefore, a light source 22a in the light source module 2a can also only include a first light source 221a connected to a first light source connection region.

Example V

Figure 16:
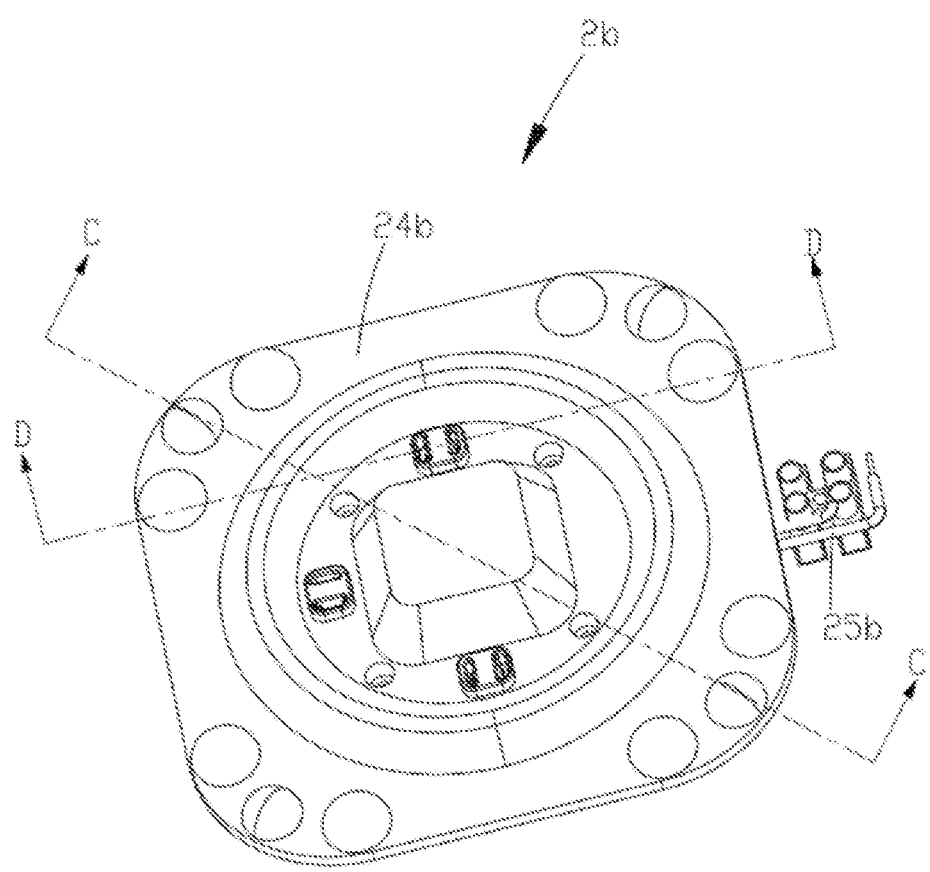
FIG. 16 is a stereoscopic assembled view of a light source module provided by Example V of the present disclosure.
Figure 17:
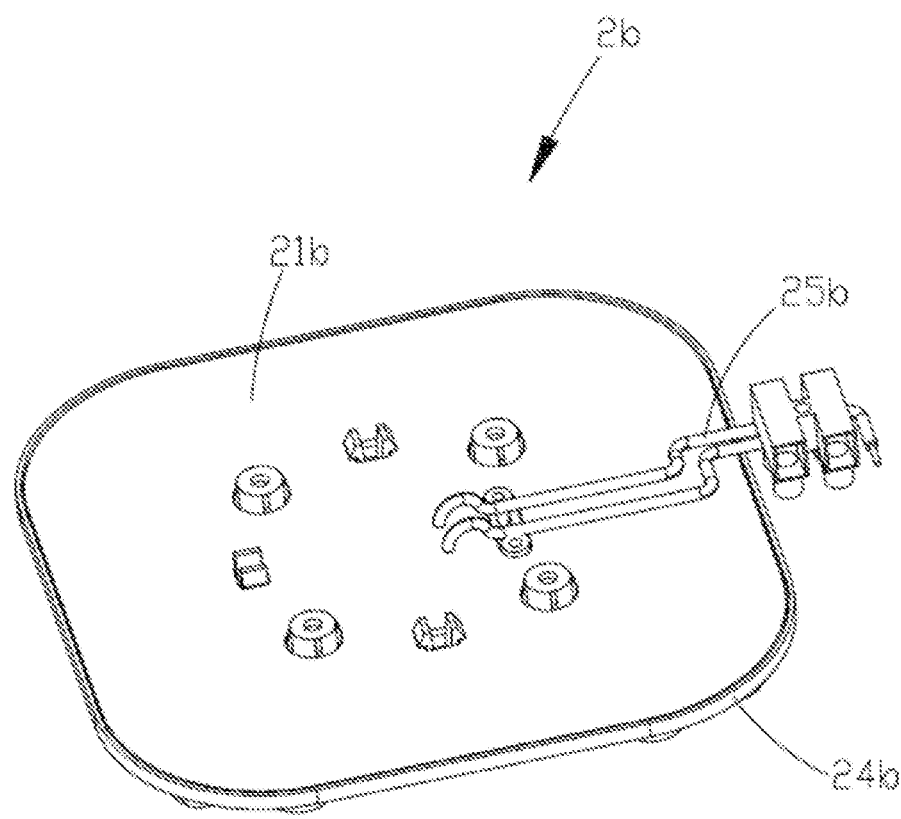
FIG. 17 is a stereoscopic assembled view of the light source module as provided by Example V of the present disclosure, from another perspective.
Figure 18:
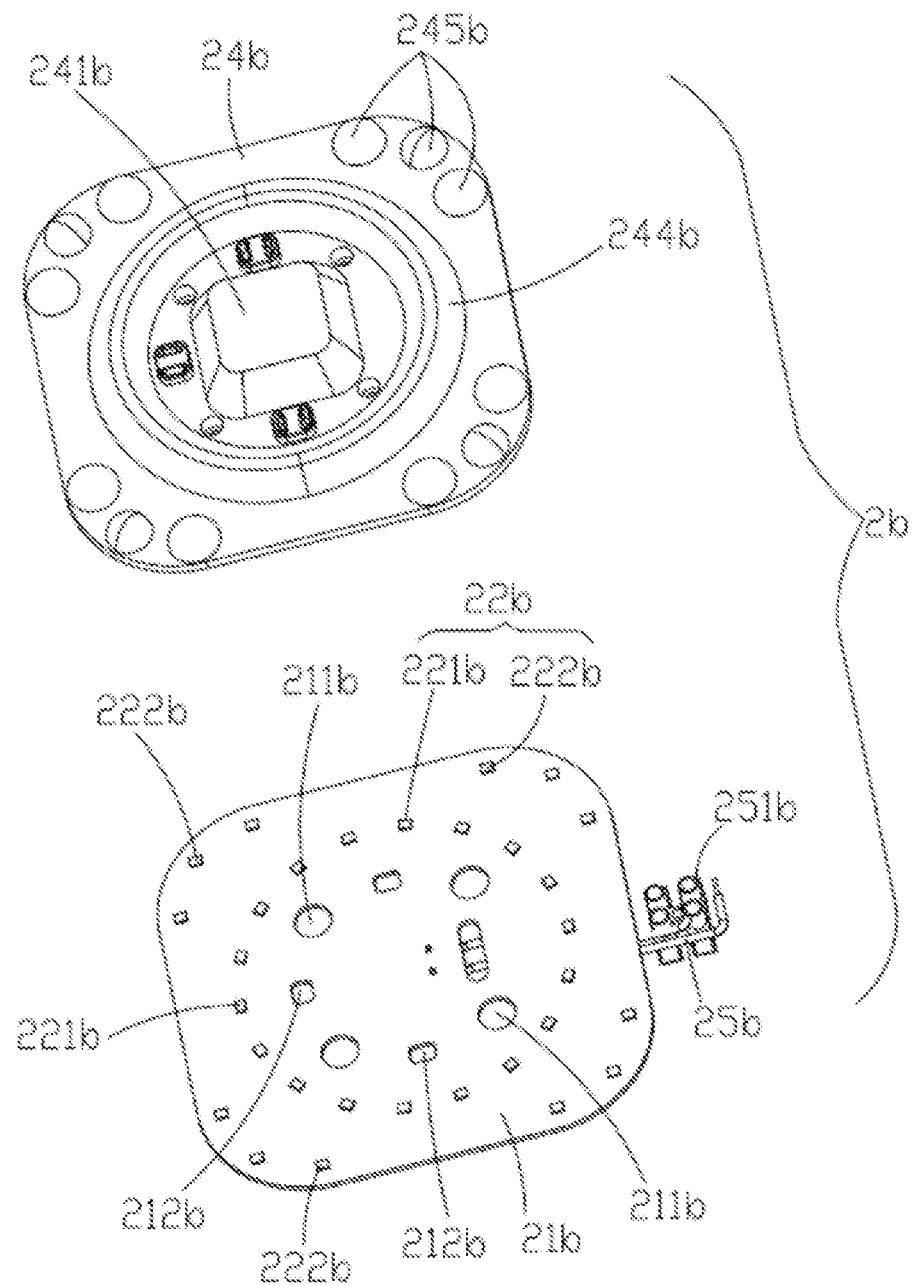
FIG. 18 is a stereoscopic exploded view of FIG. 16.
Figure 19:
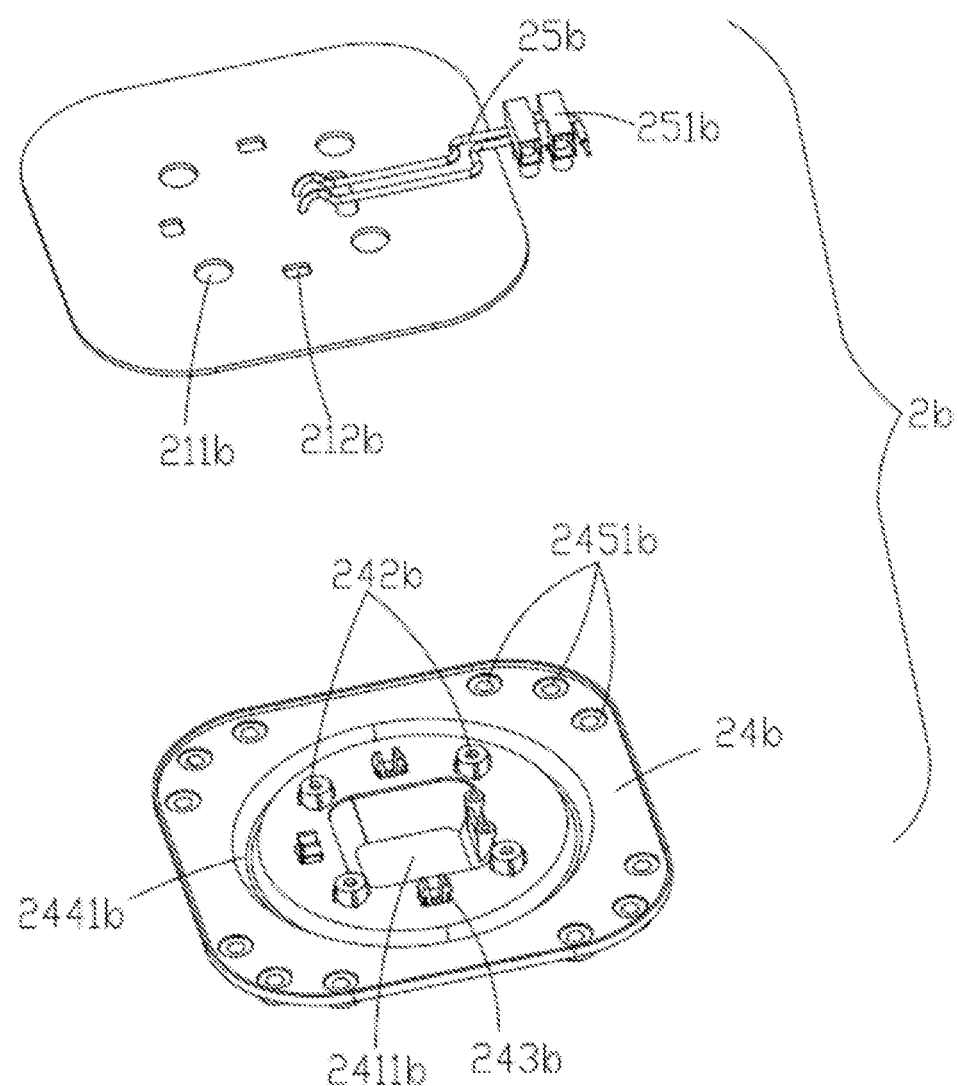
FIG. 19 is a stereoscopic exploded view of FIG. 17.

FIG. 16 and FIG. 17 illustrate a light source module 2b provided by Example V of the present disclosure. As illustrated in FIG. 18 and FIG. 19, the light source module 2b includes a substrate 21b, a plurality of light sources 22b arranged on the substrate 21b, a driving power supply (not illustrated in the drawings) arranged on the substrate 21b and electrically connected with the light sources 22b, an integrated optical element 24b located above the substrate 21b, and a cable 25b electrically connected to the substrate 21b.

A structure and a connection relationship of each component in the light source module 2b will be described in more details below.

As illustrated in FIGS. 18-21, the substrate 21b can be a printed circuit board (PCB), and the PCB is provided with a conductive line (not illustrated in the drawings) and a light source connection region (unmarked) for connecting the light source 22b. A configuration of the substrate 21b on a horizontal plane is substantively the same with that of the optical element 24b, the substrate 21b is of a square shape, and four corners of the substrate 21b are all rounded corners. The substrate 21b is provided with four first through holes 211b and three second through holes 212b, which are matched with the optical element 24b, and the first through holes 211b and the second through holes 212b are distributed in a staggered mode in a circumferential direction. It should be explained that, the above-mentioned light source connection region includes a first light source connection region and a second light source connection region; the first light source connection region is of a circular ring shape and located at peripheries of the first through holes 211b and the second through holes 212b; the second light source connection region is located at a periphery of the first light source connection region and distributed on four corners of the substrate 21b; and the second light source connection region is located at an outer side of the first light source connection region. The first light source connection region and the second light source connection region are spaced apart and are electrically connected. The first light source connection region can include a plurality of light source welding points, the second light source connection region also includes a plurality of light source welding points, and the light source 22b can be arranged in both the first and second light source connection regions. Of course, the second light source connection region can also be arranged in an edge region on the substrate 21 excluding the corner regions.

Figure 20:
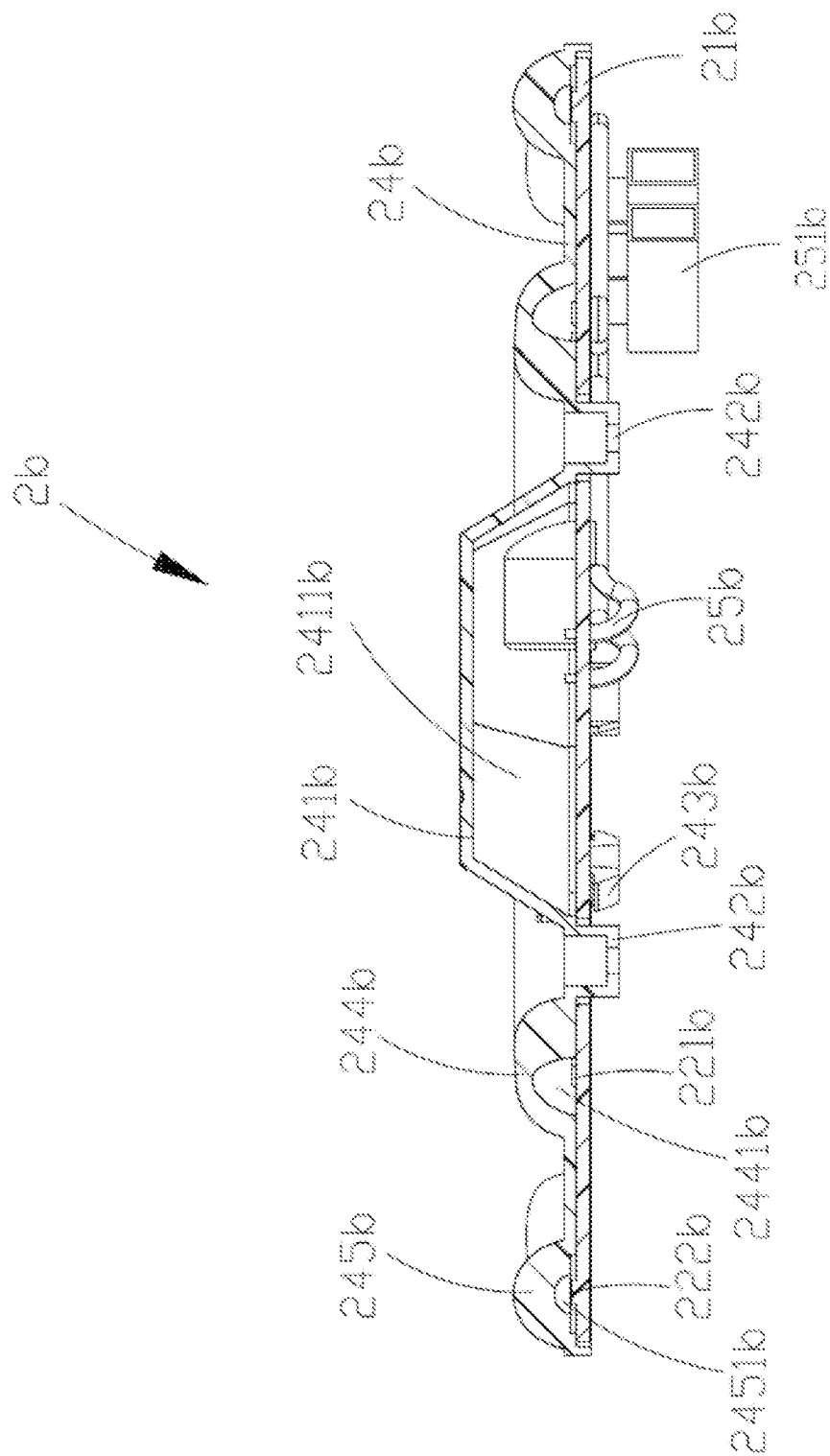
FIG. 20 is a sectional view taken along a C-C line in FIG. 16.

As illustrated in FIG. 18 and FIG. 20, the light source 22b includes a plurality of LED light-emitting units, which can be mounted in the light source connection region (not illustrated in the drawings) on an upper surface of the substrate 21b by SMT or THT. By means of conductive lines on the substrate 21b, the plurality of light-emitting units are electrically connected with each other. Further, the light source 22b includes a first light source 221b electrically connected to the first light source connection region and a second light source 222b electrically connected to the second light source connection region; the first light source 221b includes a plurality of LED light-emitting units distributed along a circumferential direction, the LED light-emitting units are arranged at peripheries of the first through holes 211b and the second through holes 212b. The second light sources 222b also include a plurality of LED light-emitting units, and are arranged in the second light source connection region on four corners of the substrate 21b.

The driving power supply can drive the light sources 22b to emit light, and includes a plurality of components, including but are not limited to a LED driving controller chip, a rectification chip, a resistor, a capacitor, a fuse, a coil and the like. The driving power supply can be arranged on an upper surface and/or a lower surface of the substrate 21b by a paste or an inserter, or a combination of the paste with the inserter. Preferably, the driving power supply can be arranged at a central position of the upper surface of the substrate 21b, which design takes full advantage of a space on the substrate 21b and achieves an effect of reducing a size of the substrate 21b.

As illustrated in FIGS. 18-21, the integrated optical element 24b is integrally formed by a transparent insulation material, such as PC and PMMA. The optical element 24b is used for performing a secondary light distribution to the light emitted from the light source 22b. The optical element 24b is roughly of a square shape, and a configuration of the optical element 24b in the horizontal plane is substantively the same with that of the substrate 21b. Also, four corners of the optical element 24b are all rounded corners. It should be explained that, the above-mentioned shape of the optical element 24b merely is used for exemplary illustration but not limitative. For example, it can also be a shape of rectangle, hexagon and the like.

Figure 21:
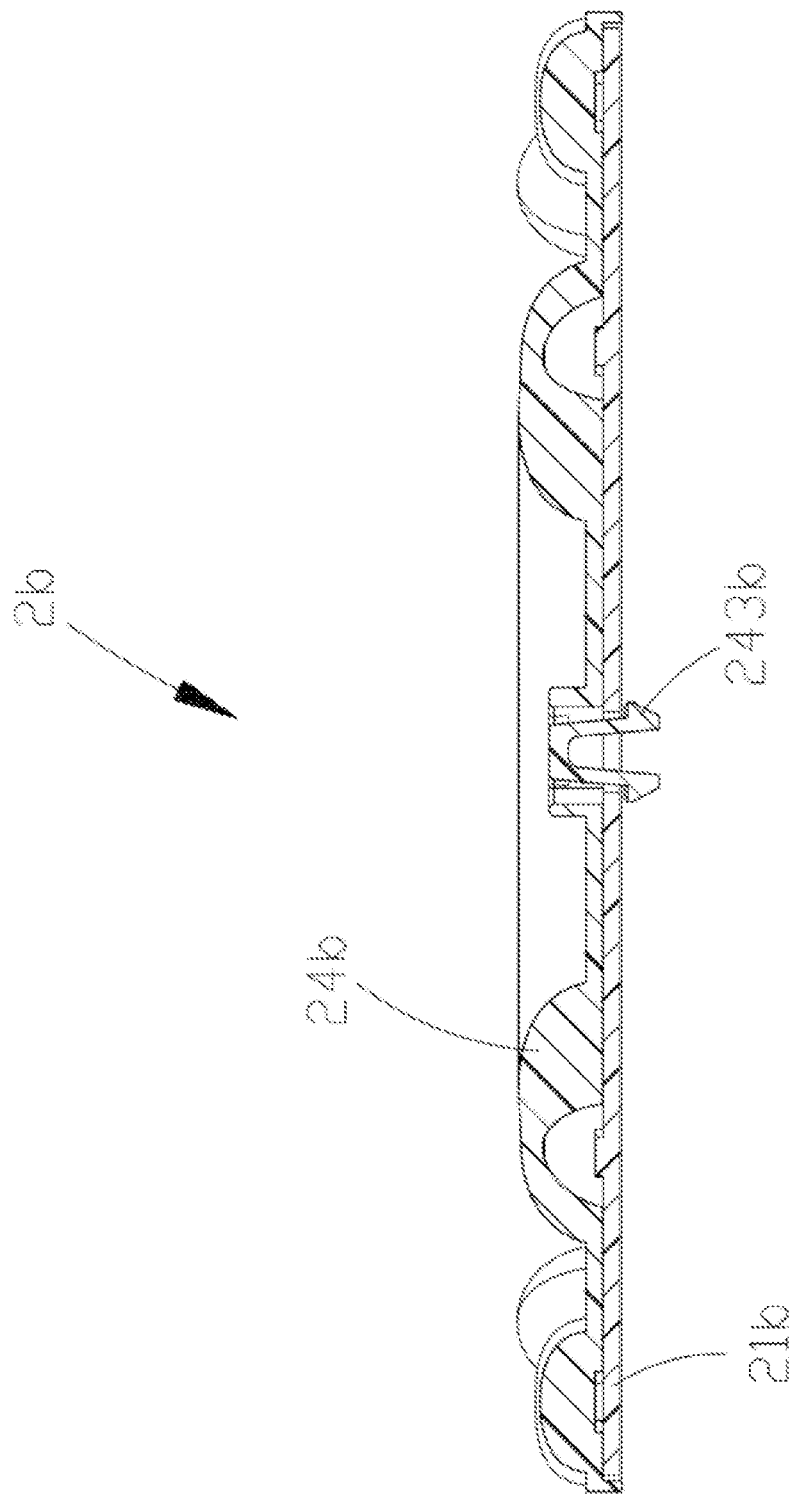
FIG. 21 is a sectional view taken along a D-D line in FIG. 16.

As illustrated in FIGS. 180-21, a middle region of the optical element 24b is arched up from a lower surface of the optical element 24b to form a protrusion portion 241b, and a groove 2411b is formed in the protrusion portion 241b to accommodate the driving power supply. Therefore, the protrusion portion 241b can be referred to as a driving power supply accommodation region.

As illustrated in FIGS. 18-21, the optical element 24b is also provided with four first positioning pillars 242b which can pass through the first through holes 211b in the substrate 21b and three first buckling portions 243b which can be matched with the second through holes 212b in the substrate 21b. Particularly, the first buckling portion 243b can pass through the second through hole 212b and be locked onto a lower surface of the substrate 21b; by means of the above-mentioned cooperation, the optical element 24b and the substrate 21b can be positioned and connected together.

The optical element 24b is provided with one first optical region 244b and four second optical regions 245b, which are arched up from the lower surface of the optical element 24 and used for performing the secondary light distribution. The first optical region 244b corresponds to the first light source 221, and the second optical region 245b corresponds to the second light source 222.

A structure of the first optical region 244b of the optical element 24b in Example V of the present disclosure is as same as the structure of the first optical region 244 of the optical element 24 in Example I of the present disclosure, and will not be repeated herein.

As illustrated in FIG. 18 and FIG. 19, several second optical regions 245b are evenly distributed on four corners of the optical elements 24b, each second optical region 245b is a circular lens, and can be referred to as a second lens. The second optical region 245b is also provided with a groove 2451b which is opened downwards and has an arc shape, and the second light source 222b on the substrate 21b is located below the second optical region 245b of the optical element 24b and corresponds to the groove 2451b, so that the second light source 222b can be regarded as being accommodated in the groove 2451b. Therefore, the groove 2451b can also be referred to as a second light source accommodation groove.

As illustrated in FIGS. 18-20, one end of the cable 25b is connected to the substrate 21b and is electrically connected with the driving power supply on the substrate 21b, and the other end of the cable 25b can be connected with an external power supply. The cable 25b is further provided with a cable arrangement apparatus 251b which is matched with the second buckling portion 122b and the second positioning pillar 121b on the bottom wall 12b of the base 1b so that the cable arrangement apparatus 251b can be positioned on the base 1b, and thus, the cable 25b can also be well arranged and positioned.

Example VI

Figure 22:
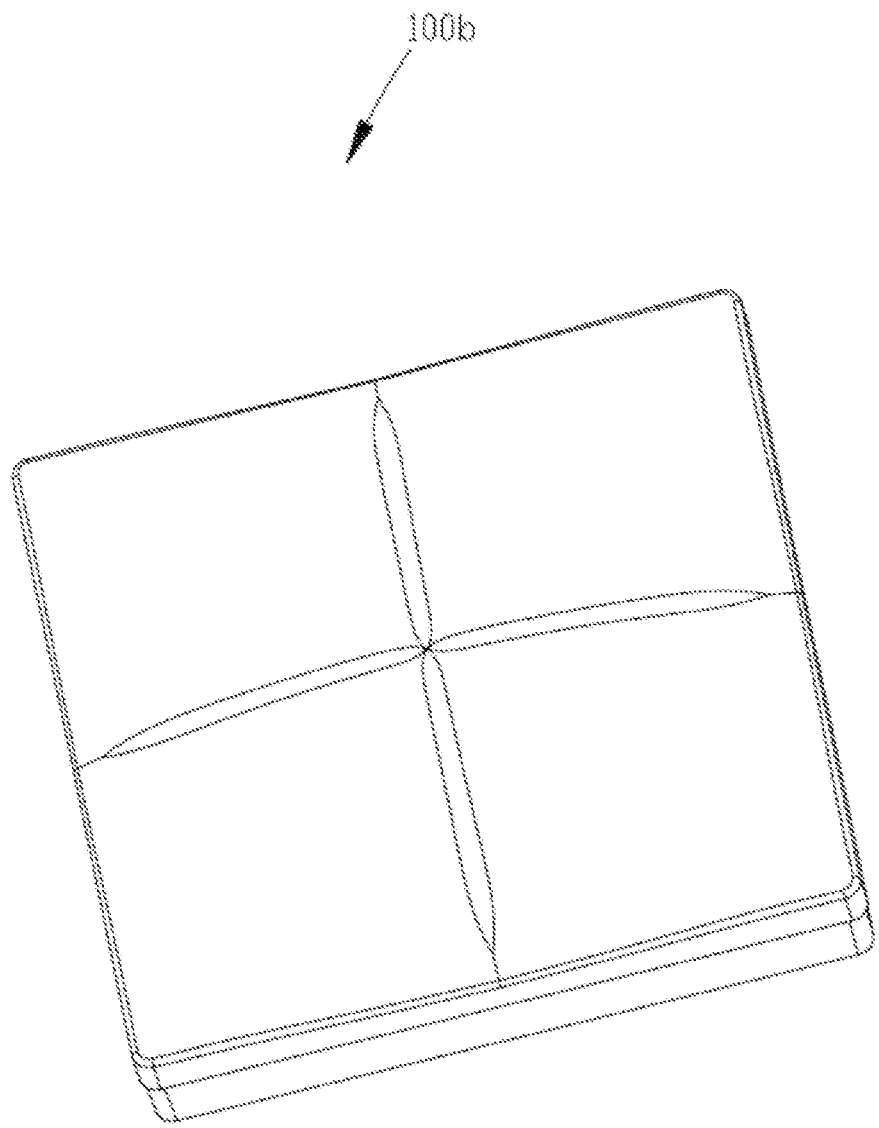
FIG. 22 is a stereoscopic assembled view of a lighting device provided by Example VI of the present disclosure.
Figure 23:
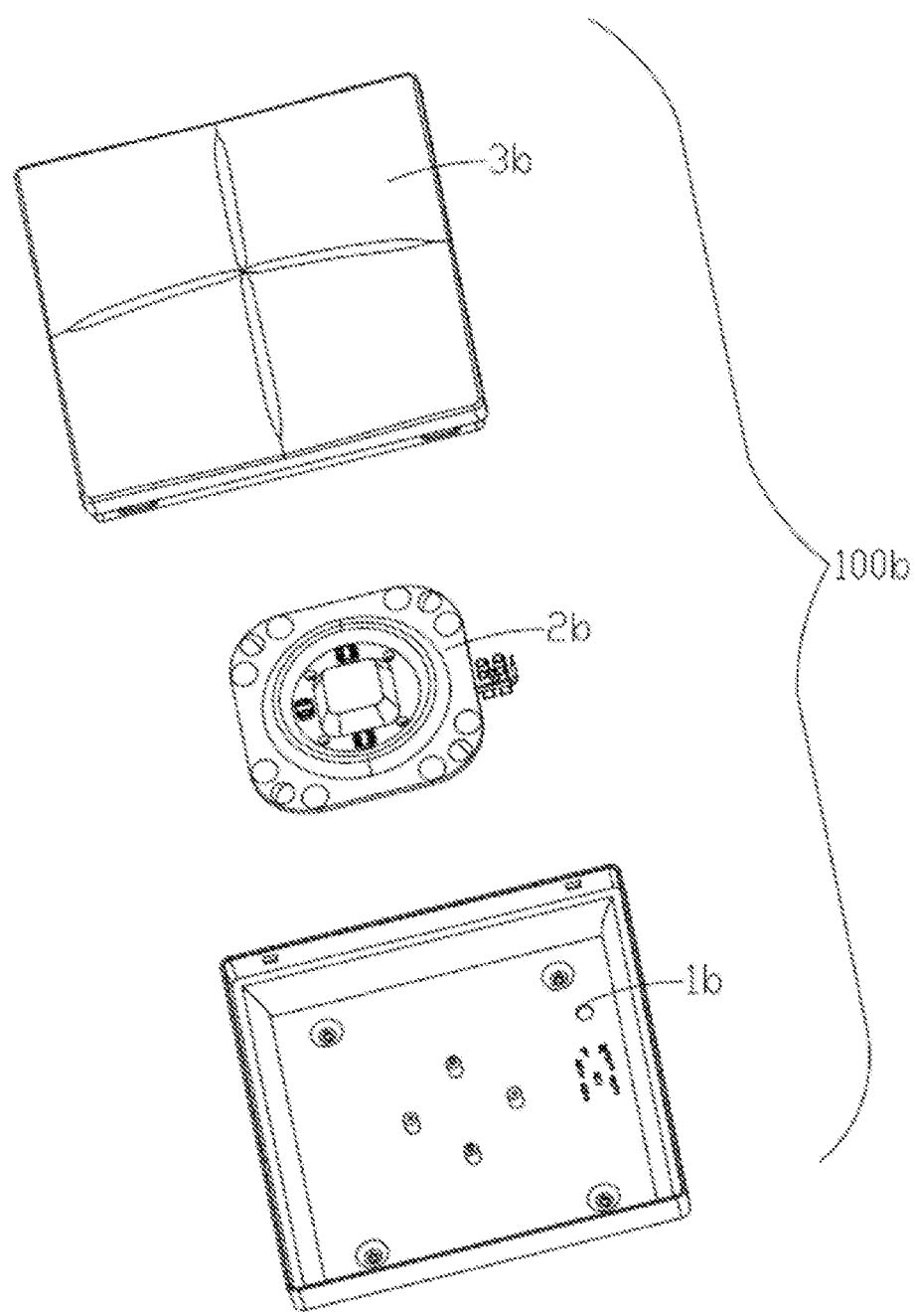
FIG. 23 is a stereoscopic exploded view of the lighting device provided by Example VI of the present disclosure.

FIG. 22 and FIG. 23 illustrate a lighting device 100b provided by Example VI of the present disclosure. As illustrated in FIG. 22 and FIG. 23, the lighting device 100b includes: a base 1b, a light source module 2b accommodated in the base 1b, and a mask 3b which is assembled at an open end of the base 1b and seals up the light source module 2b. A combination of the base 1b with the mask 3b is a shell of the lighting device 100b.

The base 1b and the mask 3b in the lighting device 100b provided by Example VI of the present disclosure have a same structure with that of the base 1 and the mask 3 in the lighting device 100 provided by Example II of the present disclosure, and will not be repeated herein.

From the above, the light source module 2b can be applied in the lighting device 100b in a detachable mode, as an independent component. A first light source 221b of the light source module 2b is a main light source, and after passing through a first optical region 244b, light emitted from the first light source 221b is uniformly distributed in most of the regions of the mask 3b, excluding regions of four corners of the mask 3b. A second light source 222b of the light source module 2b is an auxiliary light source, and is arranged on four corners of a substrate 21b and correspond to the four corners of the mask 3b, so that after passing through a second optical region 245b, light emitted from the second light source 222b is also uniformly distributed in regions of the four corners of the mask 3b. By the arrangement of the second light source 222b and the second optical region 245b, the problem that there is a region covered by neither the first light source 221b nor the first optical region 244b can be solved. Therefore, the light emitted from the first light source 221b and the second light source 222b can be uniformly distributed on the mask 3b after being subjected to a light distribution by the optical element 24b.

Example VII

Figure 24:
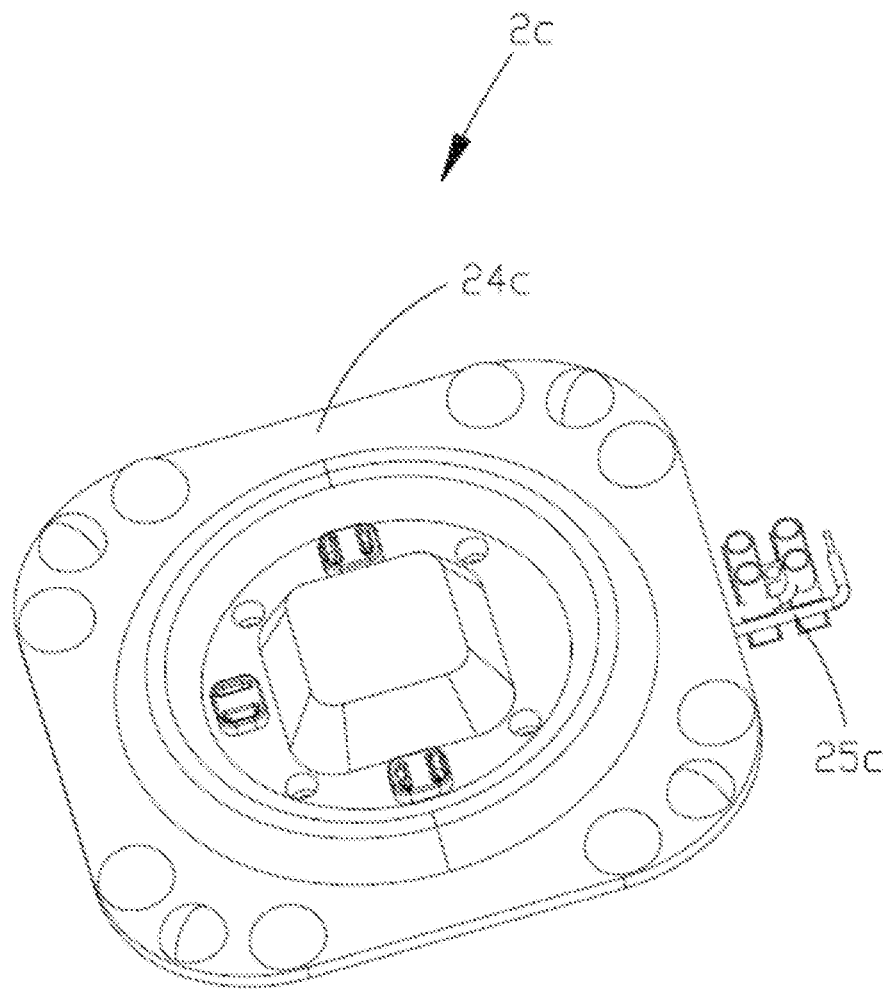
FIG. 24 is a stereoscopic assembled view of a light source module provided by Example VII of the present disclosure.
Figure 25:
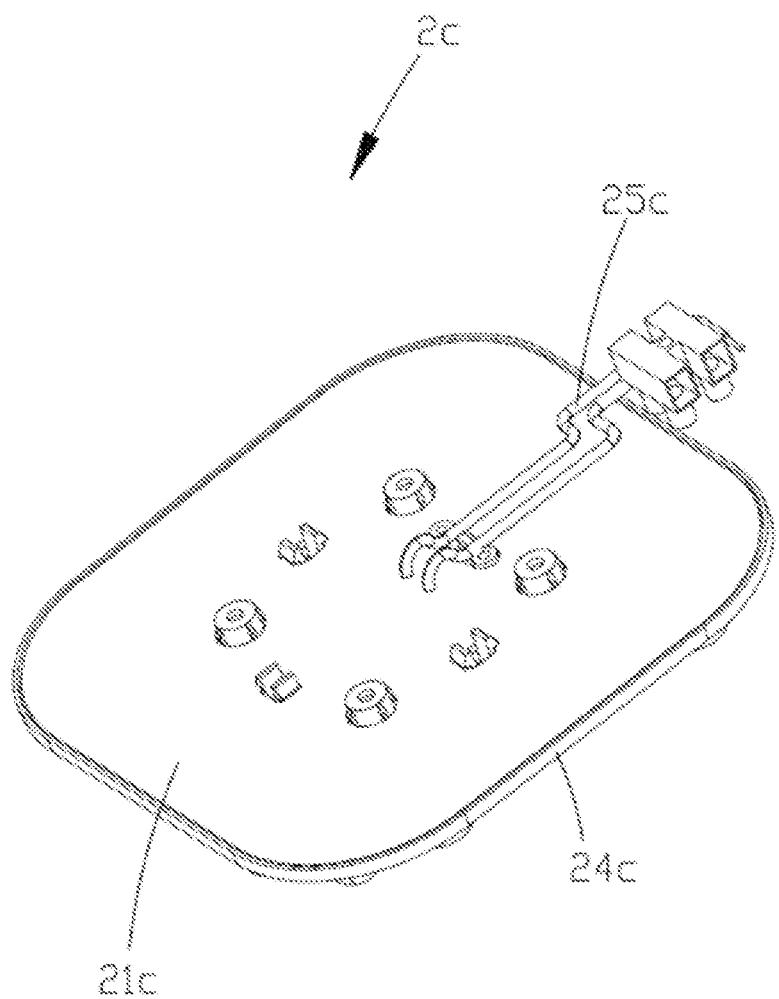
FIG. 25 is a stereoscopic assembled view of the light source module as provided by Example VII of the present disclosure, from another perspective.
Figure 26:
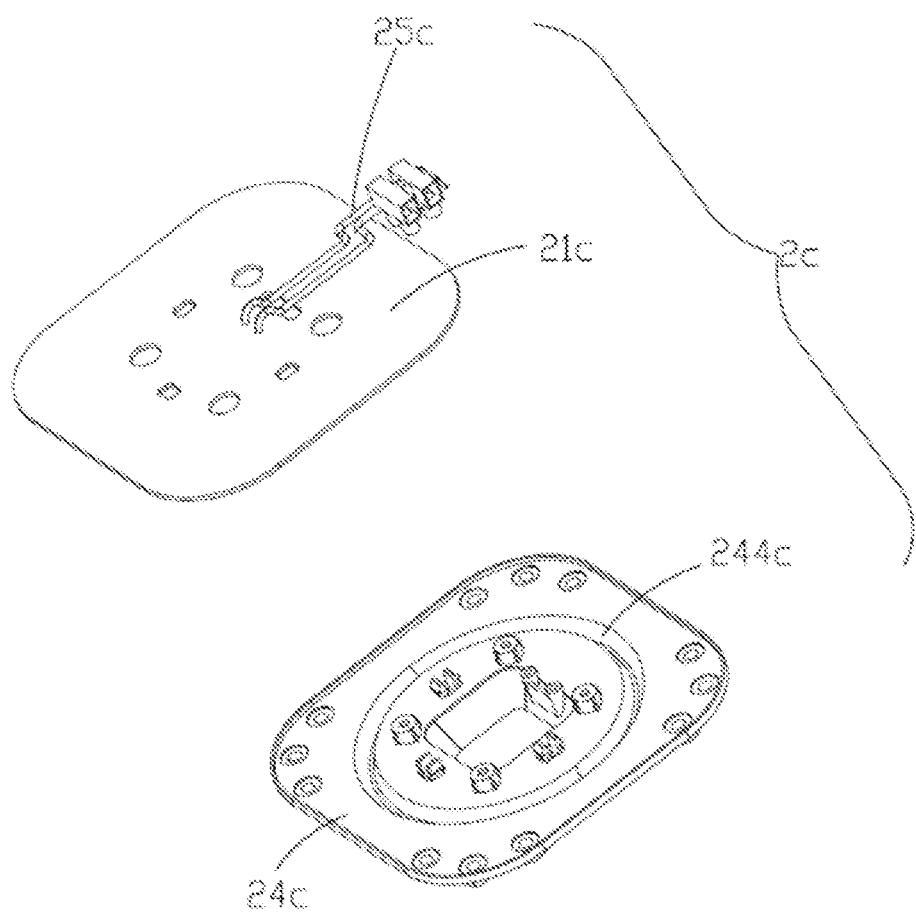
FIG. 26 is a stereoscopic exploded view of FIG. 24.
Figure 27:
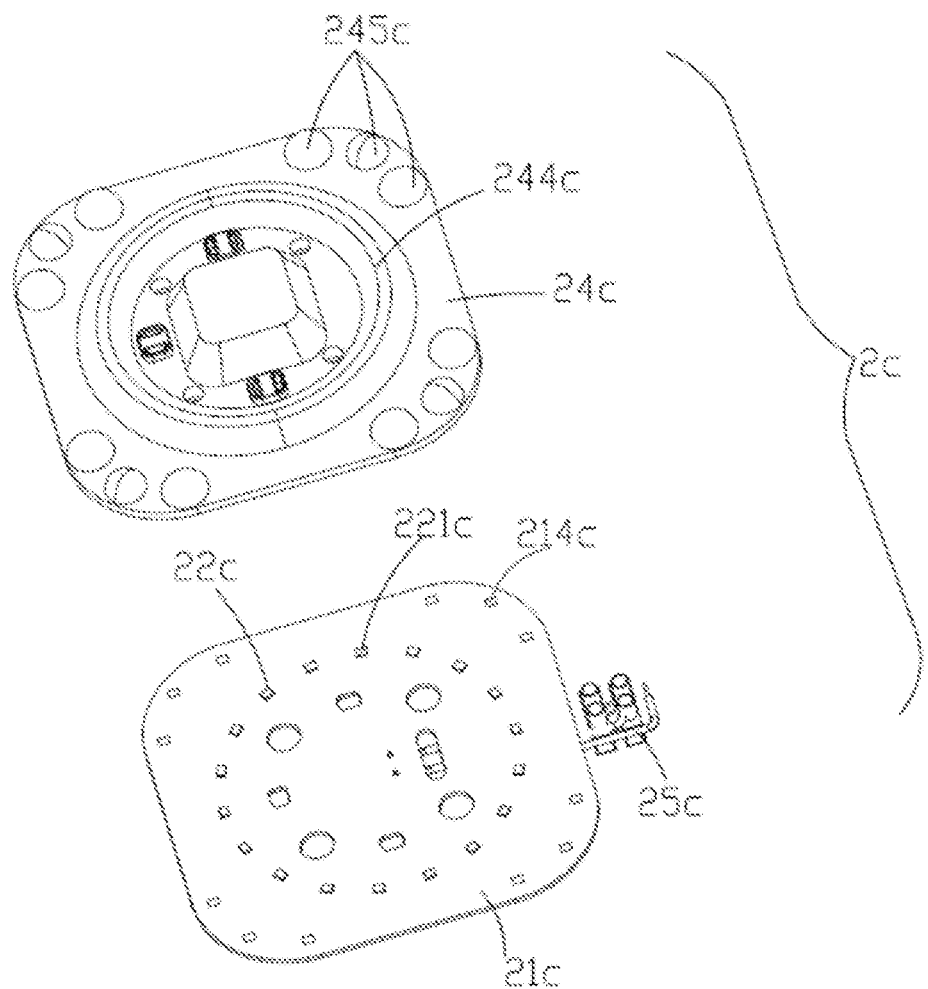
FIG. 27 is a stereoscopic exploded view of FIG. 25.

FIG. 24 and FIG. 25 illustrate a light source module 2c provided by Example VII of the present disclosure. As illustrated in FIG. 26 and FIG. 27, the light source module 2c includes a substrate 21c, a plurality of light sources 22c arranged on the substrate 21c, a driving power supply (not illustrated in the drawings) arranged on the substrate 21c and electrically connected with the light sources 22c, an integrated optical element 24c located above the substrate 21c, and a cable 25c electrically connected to the substrate 21c.

It should be explained that, the substrate 21c and the optical element 24c in the light source module 2c provided by Example VII of the present disclosure, respectively, have a same structure with that of the substrate 21a and the optical element 24a in the light source module 2a provided by Example III of the present disclosure. For example, the substrate 21c is also provided with a first light source connection region (not illustrated in the drawings) and a second light source connection region 214c.

The light source 22c only includes a first light source 221c arranged in the first light source connection region, and no second light source is arranged on the second light source connection region 214c.

Example VIII

Figure 28:
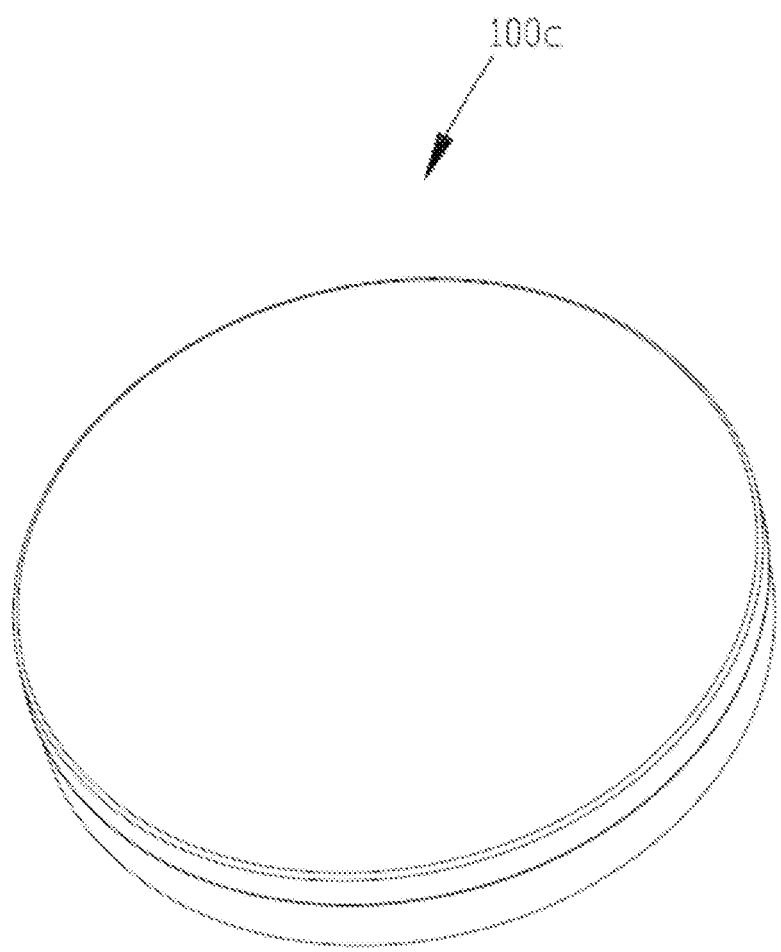
FIG. 28 is a stereoscopic assembled view of a lighting device provided by Example VIII of the present disclosure.
Figure 29:
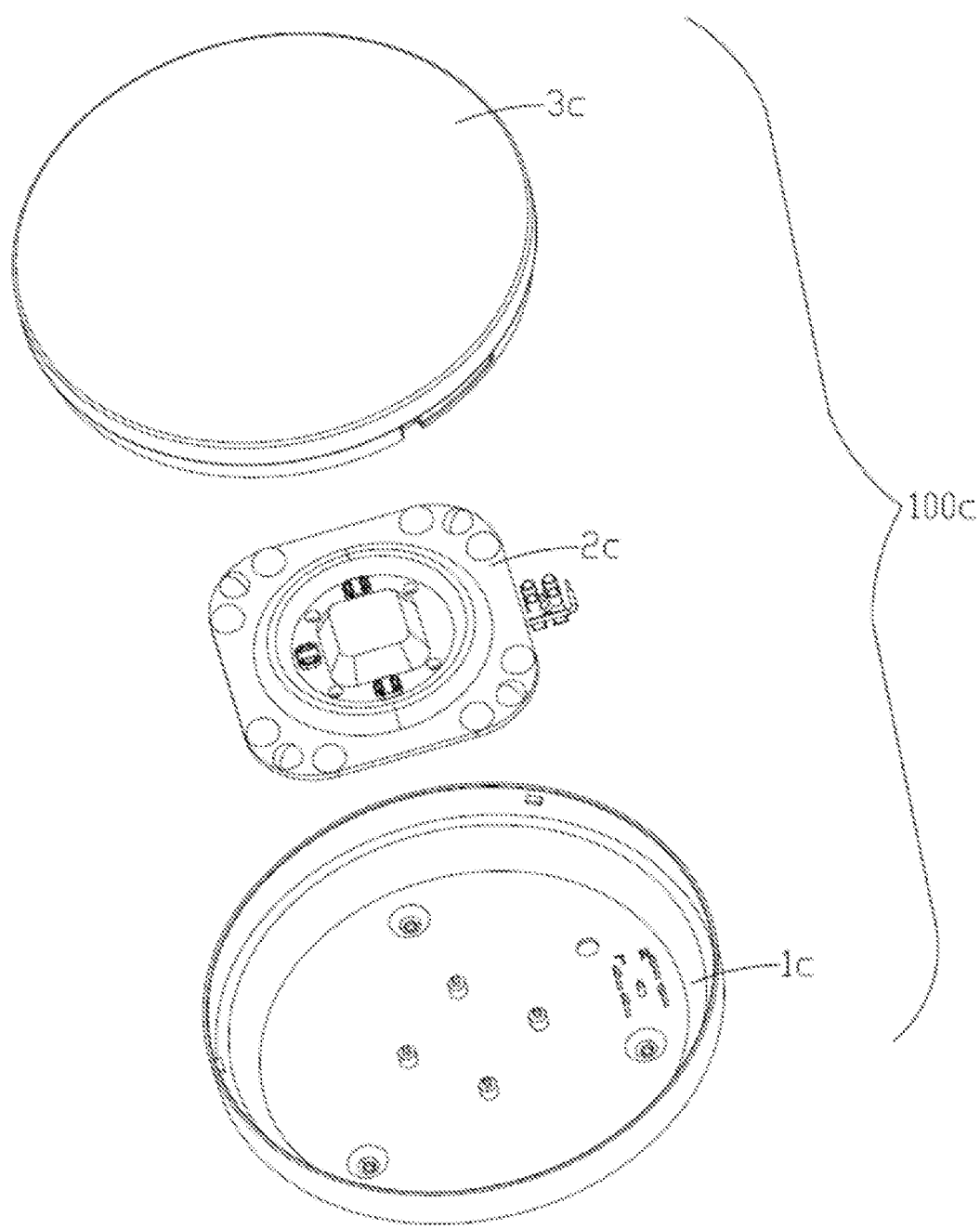
FIG. 29 is a stereoscopic exploded view of the lighting device provided by Example VIII of the present disclosure.

FIG. 28 and FIG. 29 illustrate a lighting device 100c provided by Example VIII of the present disclosure. As illustrated in FIG. 28 and FIG. 29, the lighting device 100c includes: a base 1c, a light source module 2c accommodated in the base 1c, and a mask 3c which is assembled at an open end of the base 1c and seals up the light source module 2c. A combination of the base 1c with the mask 3c is a shell of the lighting device 100c.

It should be explained that, the base 1c and the mask 3c are of a circular shape, and thus, light emitted from a first light source 221c in the light source module 2c of the lighting device 100c can be uniformly distributed on the mask 3c after being subjected to a light distribution of a first optical region 244c. Therefore, a light source 22c in the light source module 2c can also only include a first light source 221c. The base 1c and the mask 3c, respectively, have the same structure with that of the base 1a and the mask 3a in the lighting device 100a provided by Example IV of the present disclosure, and will not be repeated herein.

From the above, the light source module provided by examples of the present disclosure can be applied in different lighting devices as a module, and a substrate in the light source module is provided with a first light source connection region and a second light source connection region for connecting a light source, so that it can determine whether a second light source needs to be arranged in the second light source connection region on the substrate in the light source module according to a structure of a shell of the lighting device, thereby ensuring uniform distribution of light on a mask of the lighting device.

The present disclosure provides a light source circuit which is applied in a lighting fixture and can enable the lighting fixture to achieve an effect of emitting light uniformly.

In order to achieve the above objective, the present disclosure provides a light source module, including a substrate, a light source mounted on a surface of the substrate, and an optical element assembled on the substrate; the substrate is provided with a first light source connection region and a second light source connection region; the optical element is provided with a first lens corresponding to the first light source connection region and a plurality of second lenses corresponding to the second light source connection region; and the light source at least includes a first light source arranged on the first light source connection region.

Further, the light source module further includes a driving power supply arranged on the substrate; the optical element includes a driving power supply accommodation region for accommodating the driving power supply.

Further, the first lens is of a circular ring shape, and the second lens is of an arc shape.

Further, the first lens is of a circular ring shape, the second lens is of a circular shape, and a section of the first lens is different from a section of the second lens.

Further, the second light source connection region is located at an outer side of the first light source connection region.

Further, the light source includes a first light source arranged on the first light source connection region and a second light source arranged on the second light source connection region, the first light source corresponds to the first lens, and the second light source corresponds to the second lens.

Further, the first lens is located at an outer side of the driving power supply accommodation region, and the plurality of second lenses are located at an outer side of the first lens and arranged in a corner region of the optical element.

Further, the first lens is provided with a first light source accommodation groove opposite to the first light source, and the second lens is provided with a second light source accommodation groove opposite to the second light source.

Further, the first lens has an upper surface, the first light source accommodation groove has a bottom surface, the bottom surface is a light incident surface, the upper surface is a light emergent surface, and a curvature of the light incident surface is greater than a curvature of the light emergent surface.

Further, the substrate is provided with a plurality of first through holes and second through holes, and the optical element is provided with a plurality of first positioning pillars matched with the first through holes and a plurality of first buckling portions matched with the second through holes.

Further, the light source module includes a cable electrically connected with the substrate.

Further, the light source includes a plurality of LED light-emitting units.

An objective of the present disclosure is to provide a lighting device with an effect of emitting light uniformly, in order to solve the above-mentioned problem.

In order to achieve the above-mentioned objective, the present disclosure further provides a lighting device including the light source module as mentioned above and a shell for accommodating the light source module.

Further, the shell includes a base and a mask connected with the base, and the light source module is mounted on the base by a mechanical or magnetic element.

Further, the base is provided with an accommodation cavity for accommodating the light source module.

Further, the base includes a bottom wall and a plurality of first side walls, an inner surface of the bottom wall is provided with a plurality of second positioning pillars for positioning the light source module, a plurality of second buckling portions, a third positioning pillar and a mounting hole for positioning the base, and the first side wall is provided with a positioning block for positioning the mask.

Further, the plurality of second positioning pillars correspond to the plurality of first positioning pillars in the light source module, the plurality of first positioning pillars each are a hollow pillar, and the plurality of second positioning pillars include a hollow pillar and a solid pillar, wherein the first positioning pillar that is a hollow pillar is matched with the second positioning pillar which is a solid pillar, and the first positioning pillar that is a hollow pillar is fixedly connected with the second positioning pillar which is a hollow pillar by a screw.

Further, the mask includes a non-opaque top wall and a second side wall connected with the first side wall, and the second side wall is provided with a groove matched with the positioning block.

An objective of the present disclosure is to provide an optical element applied in a light source module, in order to solve the above-mentioned problem. The optical element can perform a light distribution to light emitted by all light sources in the light source module so as to achieve the objective of uniformly emitting light by the light source module.

In order to achieve the above-mentioned objective, the present disclosure further provides an optical element, which is used for performing a light distribution to light emitted from a light source and includes an integrally extending first lens and a plurality of second lenses distributed at a periphery of the optical element. The first lens is provided with a first light source accommodation groove, and the second lens is provided with a second light source accommodation groove.

Further, the first lens is of a circular ring shape, the second lens is of an arc shape, and a cross-sectional shape of the first lens is as same as a cross-sectional shape of the second lens.

Further, the first lens is of a circular ring shape, and each second lens is of a circular shape.

Further, the first lens is located at an inner side of the second lens.

Further, the first lens has an upper surface, the first light source accommodation groove has a bottom surface, the bottom surface is a light incident surface, and the upper surface is a light emergent surface.

Further, the first lens includes an inner portion and an outer portion, and a thickness of the inner portion is greater than that of the outer portion.

Further, the optical element is provided with a magnetic element for positioning the optical element.

The light source module provided by the present disclosure can be applied in different lighting devices as a module, and a substrate in the light source module is provided with a first light source connection region and a second light source connection region for connecting a light source, so that it can determine whether a second light source needs to be arranged in the second light source connection region on the substrate in the light source module according to a structure of a shell of the lighting device, thereby ensuring uniform distribution of light on a mask of the lighting device.

The present disclosure may include dedicated hardware implementations such as application specific integrated circuits, programmable logic arrays and other hardware devices. One or more examples described herein may implement functions using one or more specific interconnected hardware modules or devices with related control and data signals that can be communicated through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module may be a hardware component or an element with or without an electronic circuit.

The examples above provide further details for object(s), technical solution(s) and beneficial effect(s) of the present disclosure. It should be understood that, the foregoing merely are examples of the present disclosure, without limiting the present disclosure thereto. Any modification, equivalent replacement, improvement and the like made within the spirit and principle of the present disclosure shall be included in the protection scope of the present disclosure.

The invention claimed is:

1. A light source circuit, comprising a substrate, a light source mounted on a surface of the substrate, an optical element assembled on the substrate, and a driving power supply arranged on the substrate, wherein:
    the substrate is provided with a first light source connection region and a second light source connection region;
    the optical element is provided with a first lens corresponding to the first light source connection region and is provided with a plurality of second lenses corresponding to the second light source connection region;
    the light source at least comprises a first light source arranged on the first light source connection region;
    the optical element comprises a driving power supply accommodation region for accommodating the driving power supply; and
    the first lens is located at an outer side of the driving power supply accommodation region, and the plurality of second lenses are located at an outer side of the first lens and are arranged in a corner region of the optical element.

2. The light source circuit according to claim 1, wherein the first lens is of a circular ring shape, and at least one of the plurality of second lenses is of an arc shape.

3. The light source circuit according to claim 1, wherein the first lens is of a circular ring shape, at least one of the plurality of second lenses is of a circular shape, and a cross-sectional shape of the first lens is different from a cross-sectional shape of at least one of the plurality of second lenses.

4. The light source circuit according to claim 1, wherein the second light source connection region is located at an outer side of the first light source connection region.

5. The light source circuit according to claim 1, wherein:
    the light source comprises a first light source arranged on the first light source connection region and a second light source arranged on the second light source connection region, and the first light source corresponds to the first lens, and the second light source corresponds to at least one of the plurality of second lenses.

6. The light source circuit according to claim 5, wherein the first lens is provided with a first light source accommodation groove opposite to the first light source, and at least one of the plurality of second lenses is provided with a second light source accommodation groove opposite to the second light source.

7. The light source circuit according to claim 6, wherein the first lens has an upper surface, the first light source accommodation groove has a bottom surface, the bottom surface is a light incident surface, the upper surface is a light emergent surface, and a curvature of the light incident surface is greater than a curvature of the light emergent surface.

8. The light source circuit according to claim 1, wherein the substrate is provided with a plurality of first through holes and second through holes, and the optical element is provided with a plurality of first positioning pillars matched with the first through holes and a plurality of first buckling portions matched with the second through holes.

9. The light source circuit according to claim 1, comprising a cable electrically connected with the substrate.

10. The light source circuit according to claim 1, wherein the light source comprises a plurality of Light-Emitting Diode (LED) light-emitting units.

11. A lighting device, comprising a light source circuit and a shell for accommodating the light source circuit, wherein the light source circuit comprises a substrate, a light source mounted on a surface of the substrate, an optical element assembled on the substrate, and a driving power supply arranged on the substrate, wherein:
    the substrate is provided with a first light source connection region and a second light source connection region;
    the optical element is provided with a first lens corresponding to the first light source connection region and is provided with a plurality of second lenses corresponding to the second light source connection region;
    the light source at least comprises a first light source arranged on the first light source connection region;
    the optical element comprises a driving power supply accommodation region for accommodating the driving power supply; and
    the first lens is located at an outer side of the driving power supply accommodation region, and the plurality of second lenses are located at an outer side of the first lens and are arranged in a corner region of the optical element.

12. The lighting device according to claim 11, wherein the shell comprises a base and a mask connected with the base, and the light source circuit is mounted on the base by a mechanical or magnetic element.

13. The lighting device according to claim 12, wherein the base is provided with an accommodation cavity for accommodating the light source circuit.

14. The lighting device according to claim 12, wherein:
    the base comprises a bottom wall and a plurality of first side walls,
    an inner surface of the bottom wall is provided with a plurality of second positioning pillars for positioning the light source circuit, a plurality of second buckling portions, a third positioning pillar and a mounting hole for positioning the base, and
    at least one of the plurality of first side walls is provided with a positioning block for positioning the mask.

15. The lighting device according to claim 14, wherein:
the plurality of second positioning pillars correspond to the plurality of first positioning pillars in the light source circuit; and
each of the plurality of first positioning pillars is a hollow pillar, and the plurality of second positioning pillars comprise a hollow pillar and a solid pillar, wherein
each of the plurality of second positioning pillar that is a solid pillar is matched with the corresponding each of the plurality of first positioning pillar which is a hollow pillar, and
each of the plurality of second positioning pillar that is a hollow pillar is fixedly connected with the corresponding each of the plurality of first positioning pillar which is a hollow pillar, by a screw.

16. The lighting device according to claim 14, wherein:
the mask comprises a non-opaque top wall and a second side wall connected with at least one of the plurality of first side walls, and
the second side wall is provided with a groove matched with the positioning block.

17. An optical element for performing a light distribution to light emitted from a light source, comprising: an integrally extending first lens, and a plurality of second lenses distributed at a periphery of the optical element, wherein:
the first lens is provided with a first light source accommodation groove, and at least one of the plurality of second lenses is provided with a second light source accommodation groove;
the first lens is located at an outer side of a driving power supply accommodation region, and the plurality of second lenses are located at an outer side of the first lens and are arranged in a corner region of the optical element; and
the optical element comprises a driving power supply accommodation region for accommodating a driving power supply; and
the first lens is located at an outer side of the driving power supply accommodation region, and the at least one of the plurality of second lenses is located at an outer side of the first lens and is arranged in a corner region of the optical element.

18. The optical element according to claim 17, wherein the optical element is provided with a magnetic element for positioning the optical element.

* * * * *